(12) United States Patent
Torvinen

(10) Patent No.: US 7,751,801 B2
(45) Date of Patent: Jul. 6, 2010

(54) SERVICE TRIAL SYSTEM AND METHOD FOR INDIVIDUALS AND COMMUNITIES

(75) Inventor: Marko Torvinen, Espoo (FI)

(73) Assignee: Nokia Corporation, Espoo (FI)

( * ) Notice: Subject to any disclaimer, the term of this patent is extended or adjusted under 35 U.S.C. 154(b) by 1196 days.

(21) Appl. No.: 11/318,525

(22) Filed: Dec. 28, 2005

(65) Prior Publication Data

US 2007/0149174 A1 Jun. 28, 2007

(51) Int. Cl.
  *H04L 12/58* (2006.01)
(52) U.S. Cl. .................. 455/412.1; 455/412.2; 455/413; 455/414.1; 455/414.3
(58) Field of Classification Search ........................ None
  See application file for complete search history.

(56) References Cited

U.S. PATENT DOCUMENTS

| | | | |
|---|---|---|---|
| 5,878,258 A * | 3/1999 | Pizi et al. | |
| 6,633,315 B1 * | 10/2003 | Sobeski et al. | |
| 7,412,411 B2 * | 8/2008 | Horel et al. ................... 705/27 |
| 2001/0049641 A1 * | 12/2001 | Nakamura et al. ............ 705/26 |
| 2002/0024536 A1 * | 2/2002 | Kahan et al. | |
| 2002/0035609 A1 * | 3/2002 | Lessard et al. | |
| 2002/0054150 A1 * | 5/2002 | I'Anson et al. | |
| 2002/0077060 A1 * | 6/2002 | Lehikoinen et al. | |
| 2002/0133545 A1 * | 9/2002 | Fano et al. | |
| 2003/0040850 A1 * | 2/2003 | Najmi et al. | |
| 2003/0061110 A1 | 3/2003 | Bodin | |
| 2003/0081110 A1 * | 5/2003 | Lemieux et al. | |
| 2003/0134632 A1 * | 7/2003 | Loughran | |
| 2003/0139174 A1 * | 7/2003 | Rao | |
| 2003/0148775 A1 * | 8/2003 | Spriesterbach et al. | |
| 2004/0043788 A1 * | 3/2004 | Mittal | |
| 2004/0075675 A1 | 4/2004 | Raivisto et al. | |
| 2004/0110497 A1 * | 6/2004 | Little | |
| 2004/0171379 A1 * | 9/2004 | Cabrera et al. | |
| 2005/0060265 A1 * | 3/2005 | Schull ......................... 705/51 |
| 2005/0108319 A1 * | 5/2005 | Kohno et al. ................ 709/201 |
| 2008/0092168 A1 * | 4/2008 | Logan et al. .................. 725/44 |
| 2008/0313705 A1 * | 12/2008 | Mousseau ....................... 726/2 |

* cited by examiner

*Primary Examiner*—Patrick N Edouard
*Assistant Examiner*—Dai A Phuong
(74) *Attorney, Agent, or Firm*—Ditthavong Mori & Steiner, P.C.

(57) ABSTRACT

Mobile wireless devices include a Service Trial Client that establishes a link to a Service Trial Server to set up temporary trials of online services. The Service Trial Client and Service Trial Server enable a service provider to attract potential customers with free trial subscriptions to an online service for a limited period of time. The trial subscription can be shared with friends of the customer for the limited period of time, thereby enabling the service provider to attract a larger number of potential customers. Monitoring logic is included in the Service Trial Server to review the record of each trial service subscriber on a periodic basis and to prompt the subscriber and the subscriber's friends to subscribe the service provider's normal paid-subscription service at the end of the trial period. The result is a complete over-the-air service trial and subscription tool that integrates discovery, trial and subscription functions for online services.

21 Claims, 23 Drawing Sheets

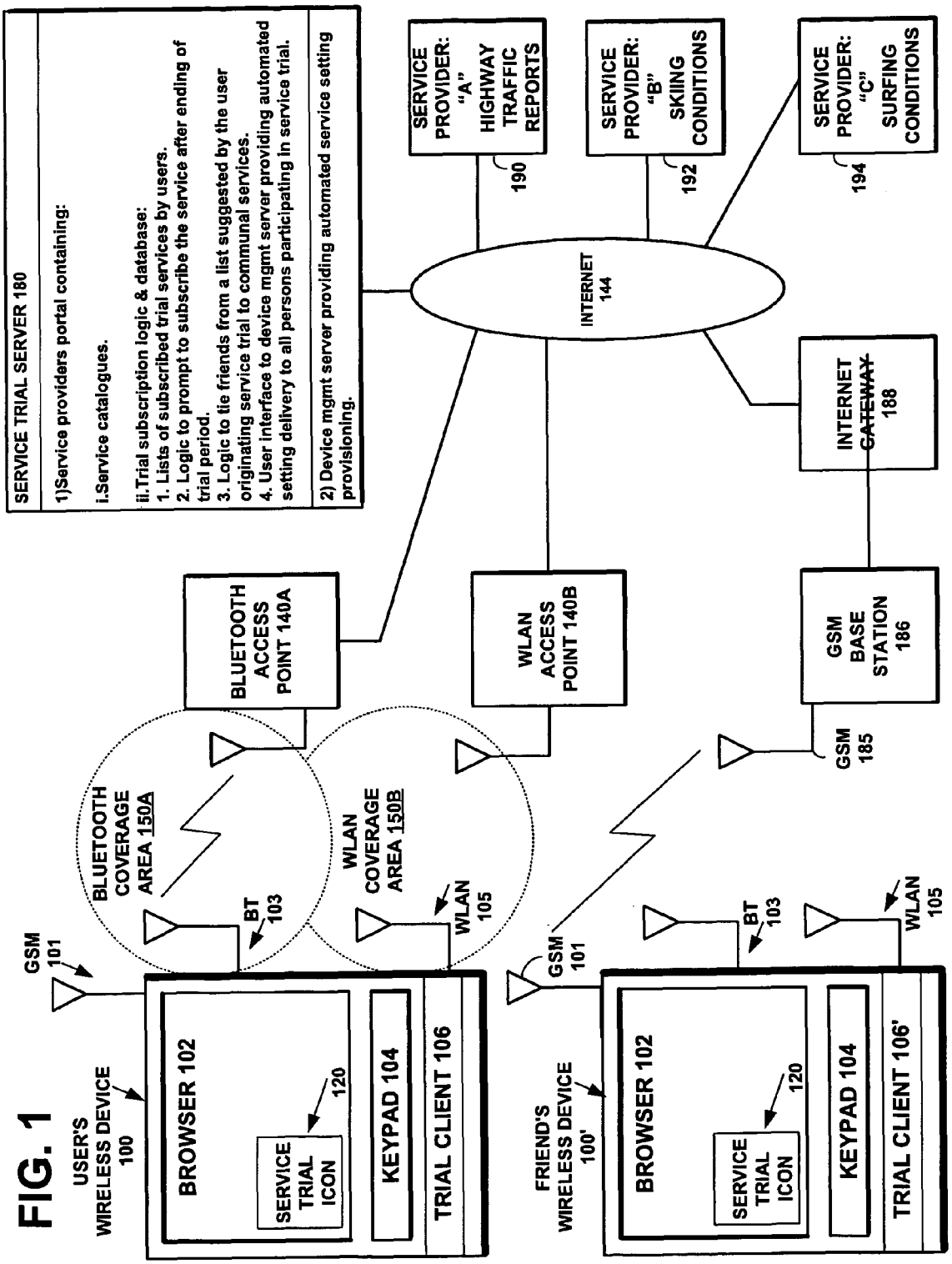

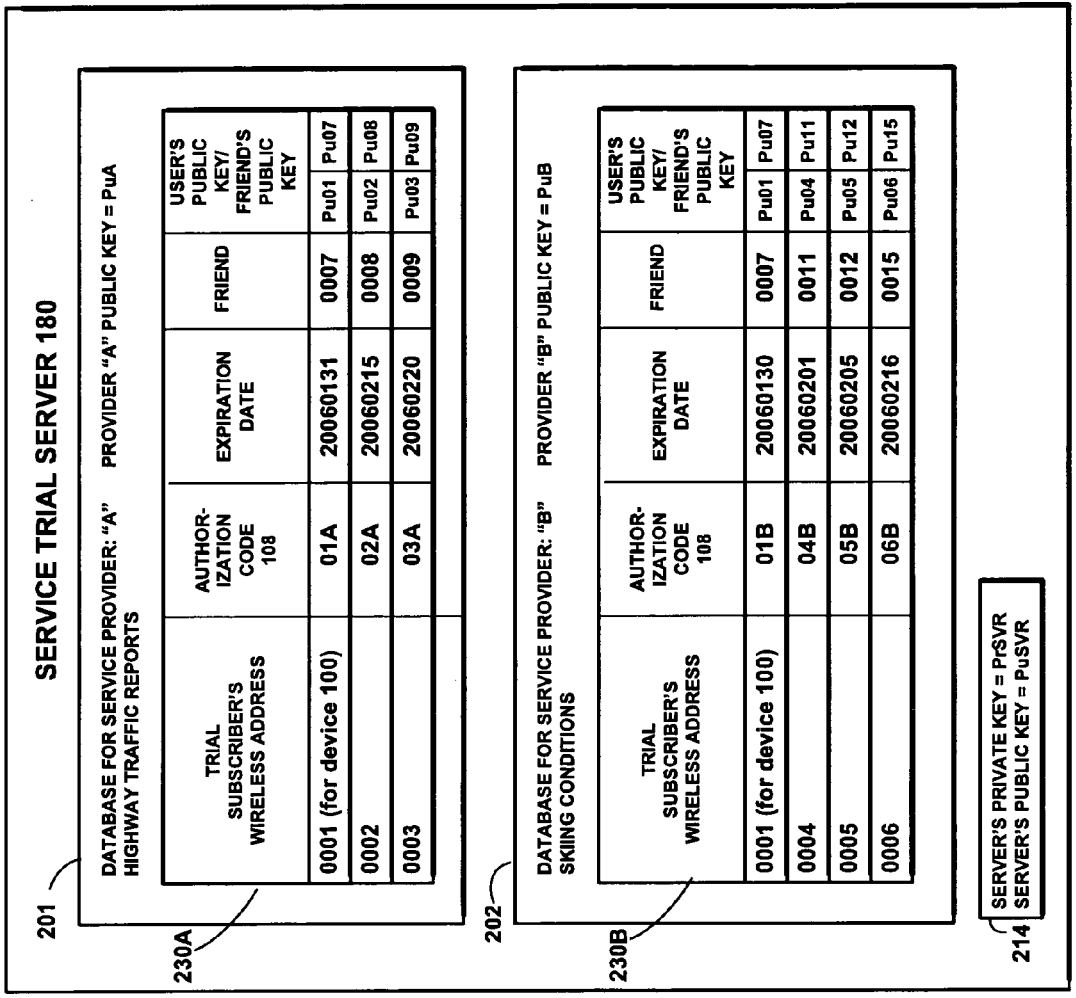
FIG. 2C
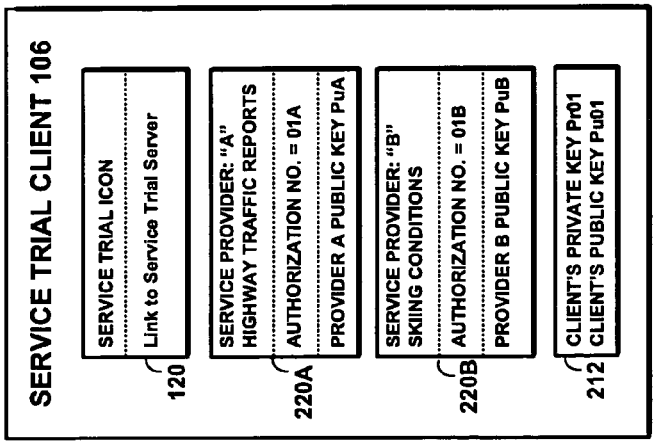
FIG. 2B
FIG. 2D

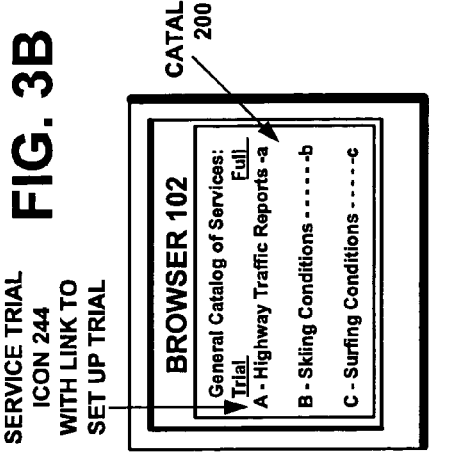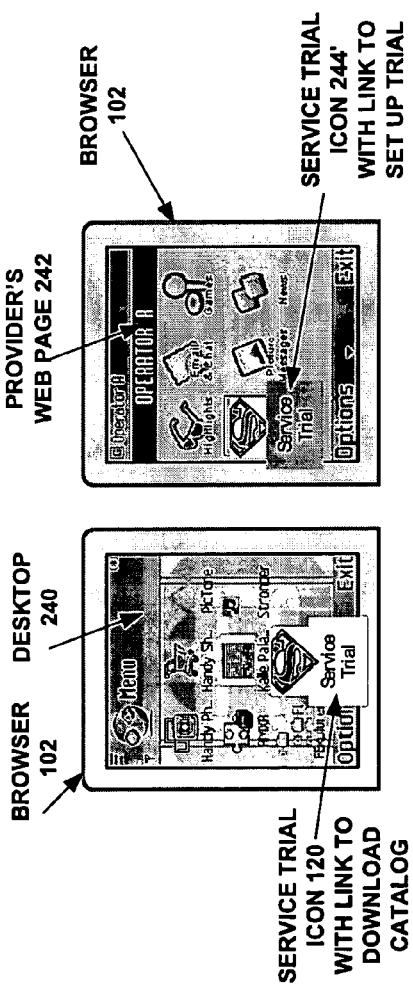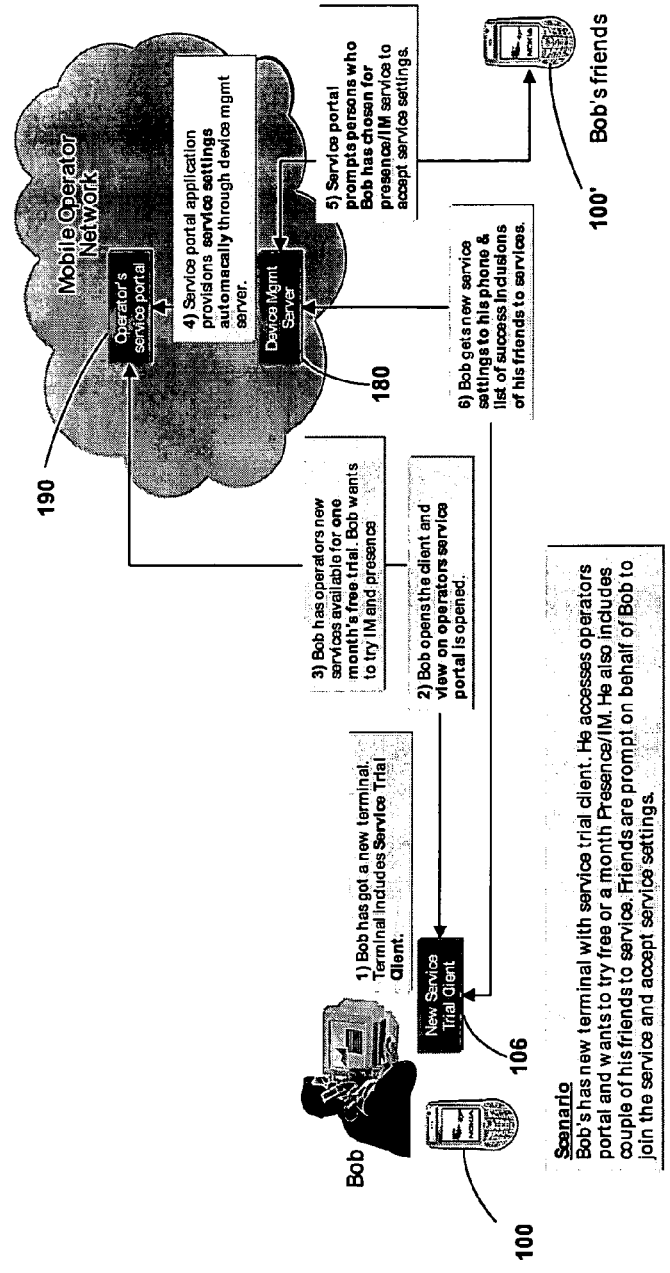

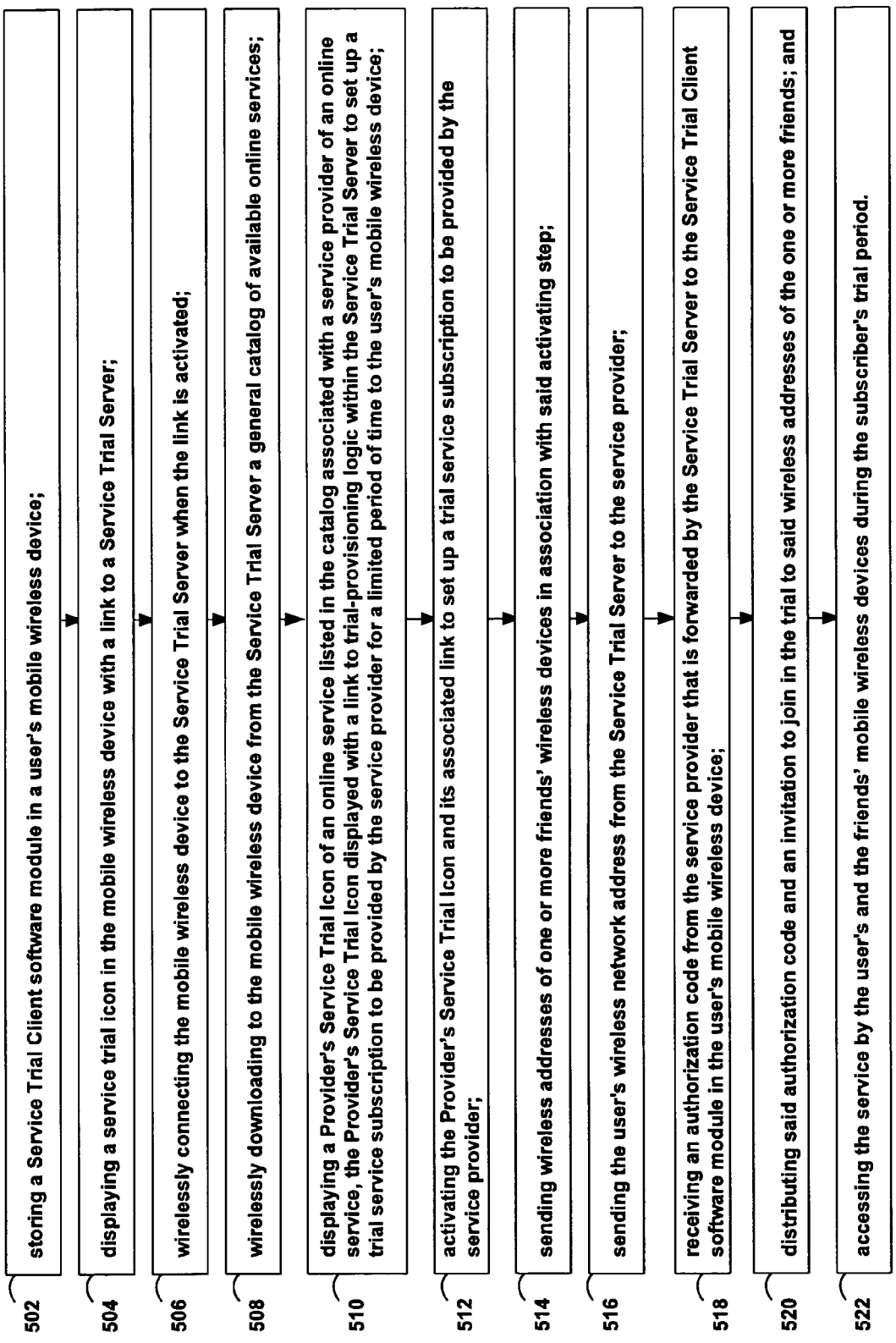

FIG. 5A

Flow Diagram for providing a trial online service accessible by a plurality of mobile wireless devices 502 — storing a Service Trial Client software module in a user's mobile wireless device;

504 — displaying a service trial icon in the mobile wireless device with a link to a Service Trial Server;

506 — wirelessly connecting the mobile wireless device to the Service Trial Server when the link is activated;

508 — wirelessly downloading to the mobile wireless device from the Service Trial Server a general catalog of available online services;

510 — displaying a Provider's Service Trial Icon of an online service listed in the catalog associated with a service provider of an online service, the Provider's Service Trial Icon displayed with a link to trial-provisioning logic within the Service Trial Server to set up a trial service subscription to be provided by the service provider for a limited period of time to the user's mobile wireless device;

512 — activating the Provider's Service Trial Icon and its associated link to set up a trial service subscription to be provided by the service provider;

514 — sending wireless addresses of one or more friends' wireless devices in association with said activating step;

516 — sending the user's wireless network address from the Service Trial Server to the service provider;

518 — receiving an authorization code from the service provider that is forwarded by the Service Trial Server to the Service Trial Client software module in the user's mobile wireless device;

520 — distributing said authorization code and an invitation to join in the trial to said wireless addresses of the one or more friends; and 522 — accessing the service by the user's and the friends' mobile wireless devices during the subscriber's trial period.

Flow diagram for the user accessing the trial service

FIG. 5C

Flow diagram for the user's friend accessing the trial service

552 — directly addressing the service provider by the friend's mobile wireless device over the wireless network and sending the user's authorization code and user's wireless address;

554 — sending by said service provider a query including the friend's wireless address and user's wireless address and user's authorization code to the Service Trial Server;

556 — checking by Said Service Trial Server the user's record to confirm that the user's trial period has not expired;

558 — responding by Said Service Trial Server to the service provider whether the user is still within the trial period;

560 — if still within the period, then proceeding by the service provider to provide the service to the friend.

562 — if the user's trial period has expired, then the Service Trial Server sending a request directly to the user and the friends listed in the user's record to subscribe to the service provider's normal paid-subscription service at the end of the trial period.

SERVICE DISCOVERY

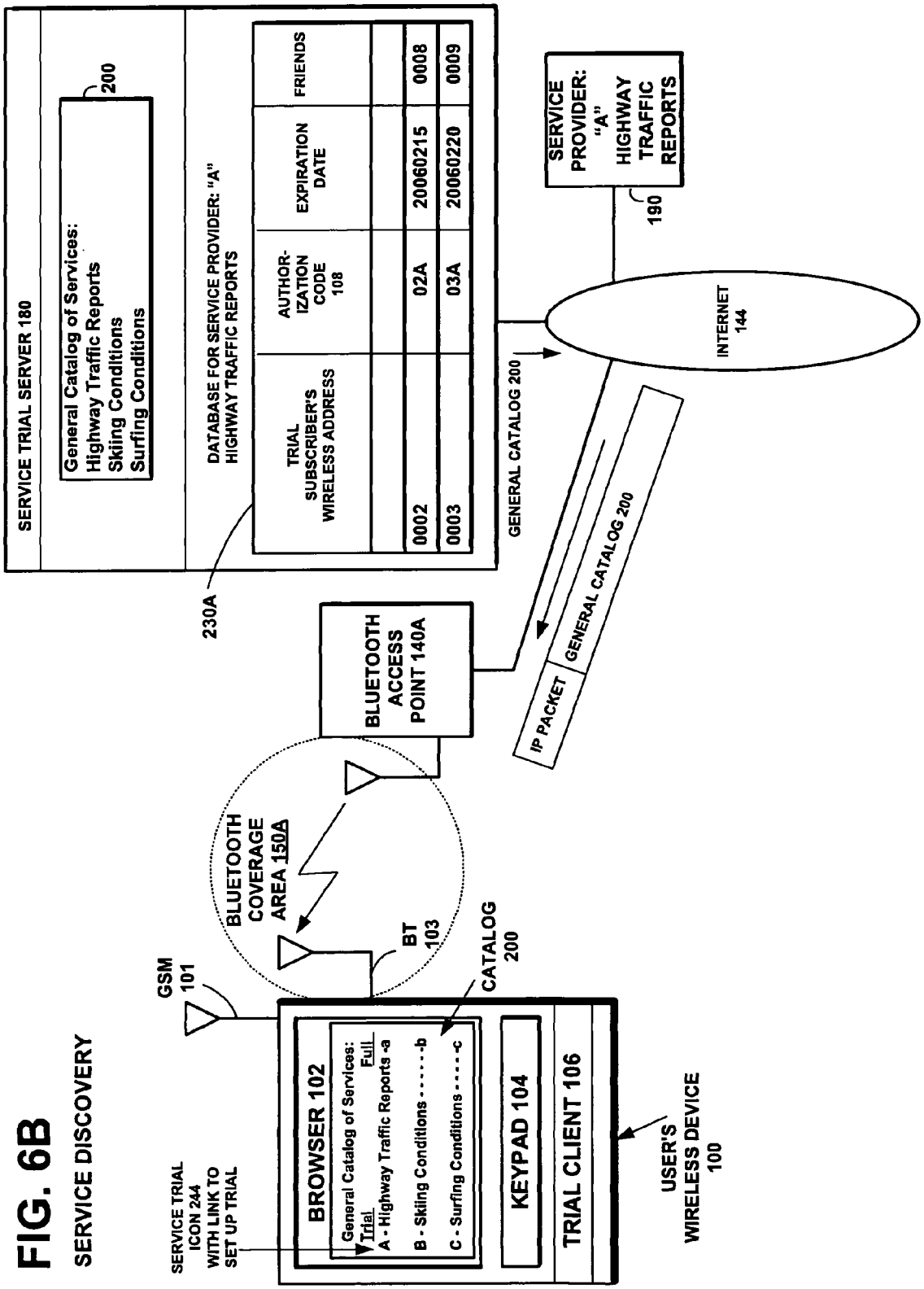
FIG. 6B SERVICE DISCOVERY

PROVISIONING

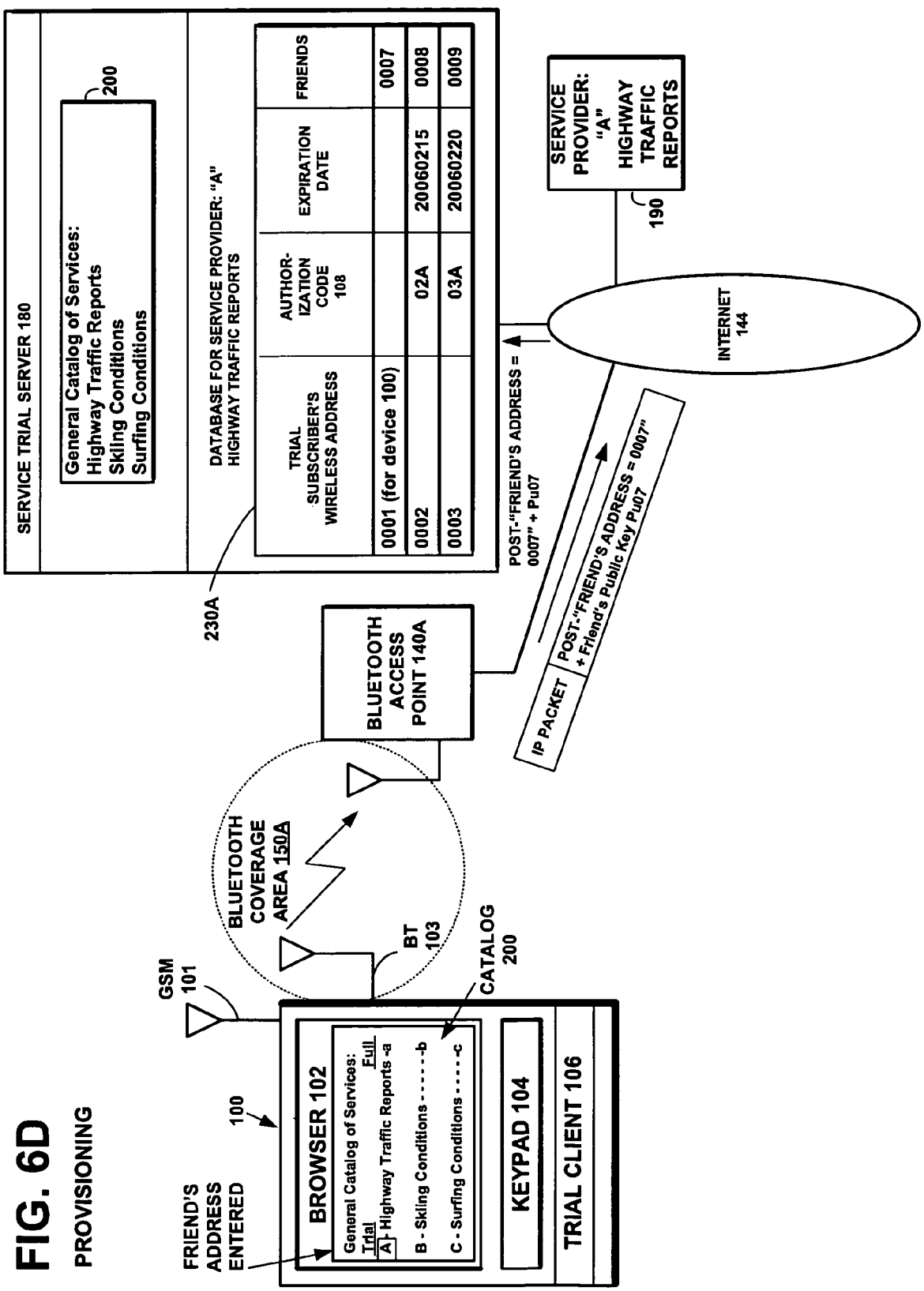
FIG. 6D PROVISIONING

PROVISIONING

PROVISIONING

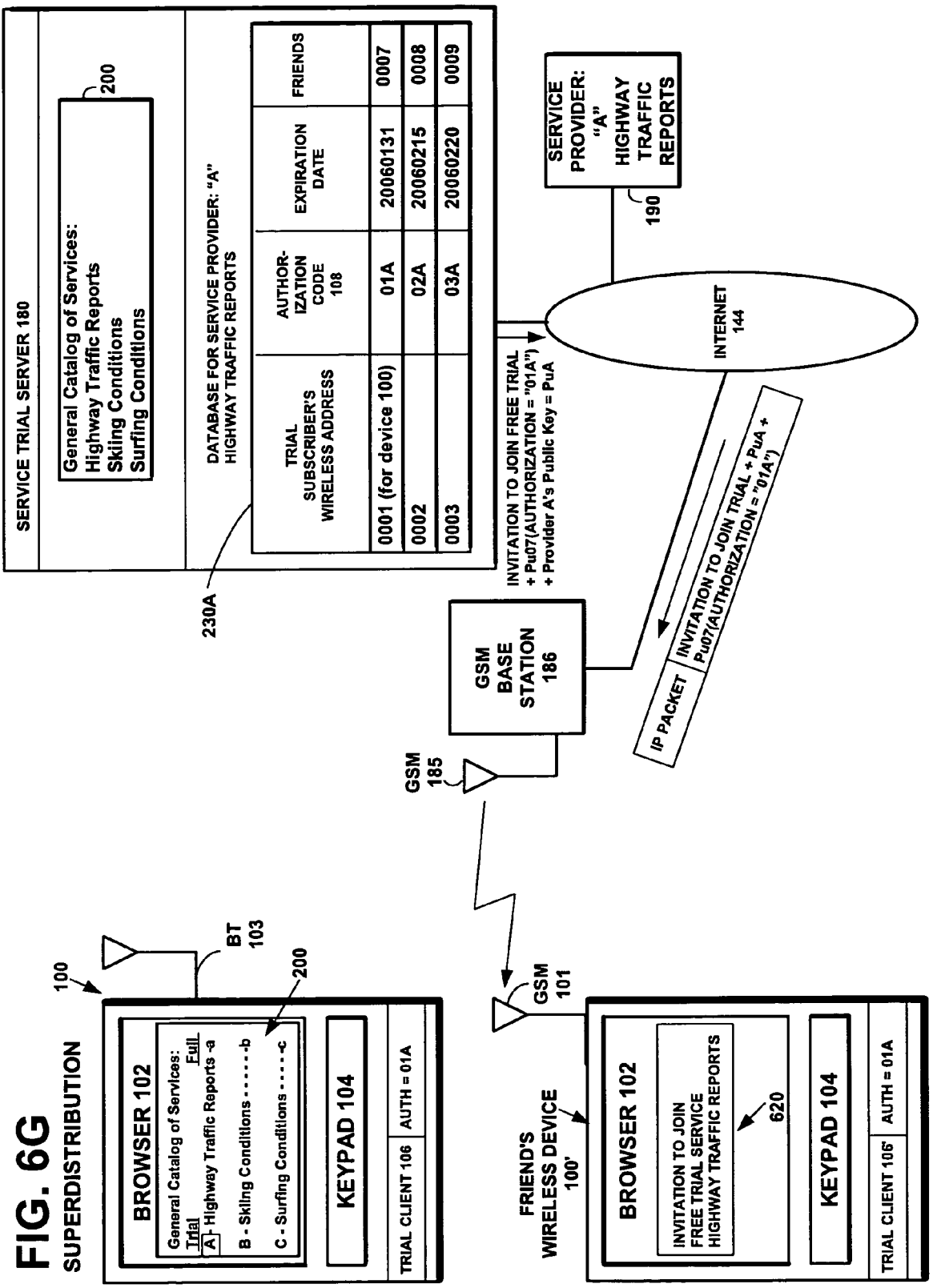

SUPERDISTRIBUTION

TRIAL SERVICE

TRIAL SERVICE

TRIAL SERVICE

TRIAL SERVICE

EXPIRED TRIAL SERVICE

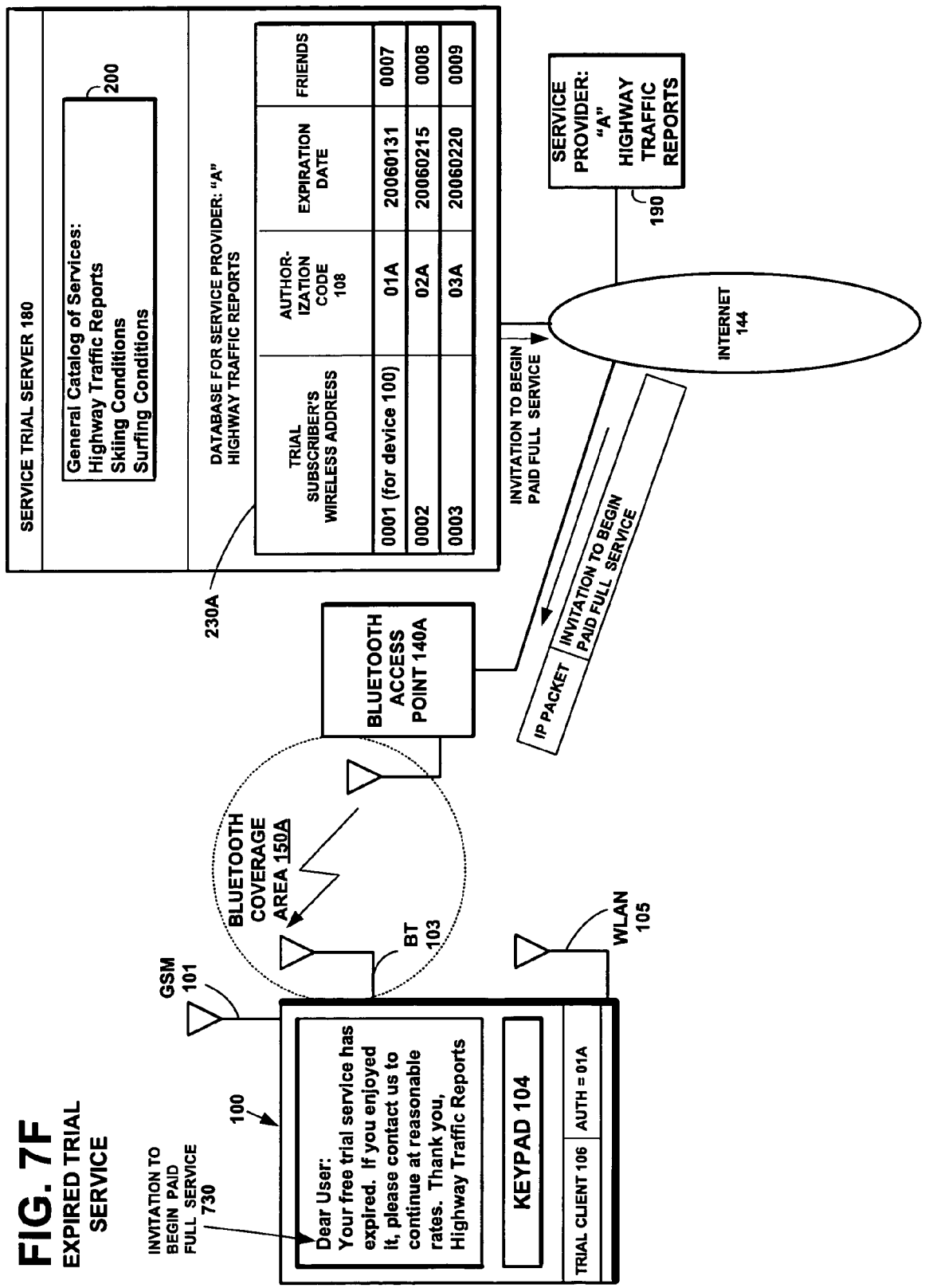

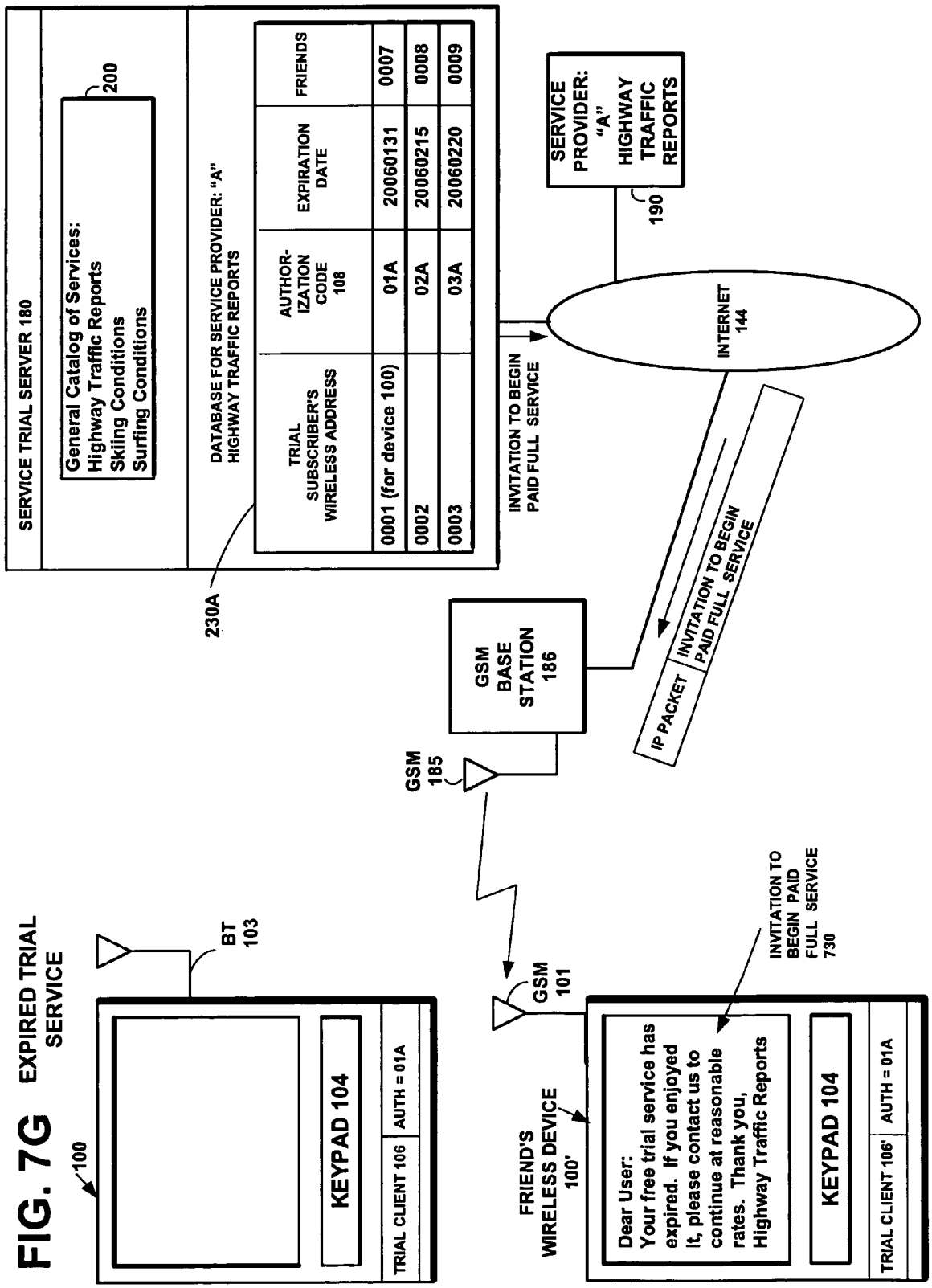

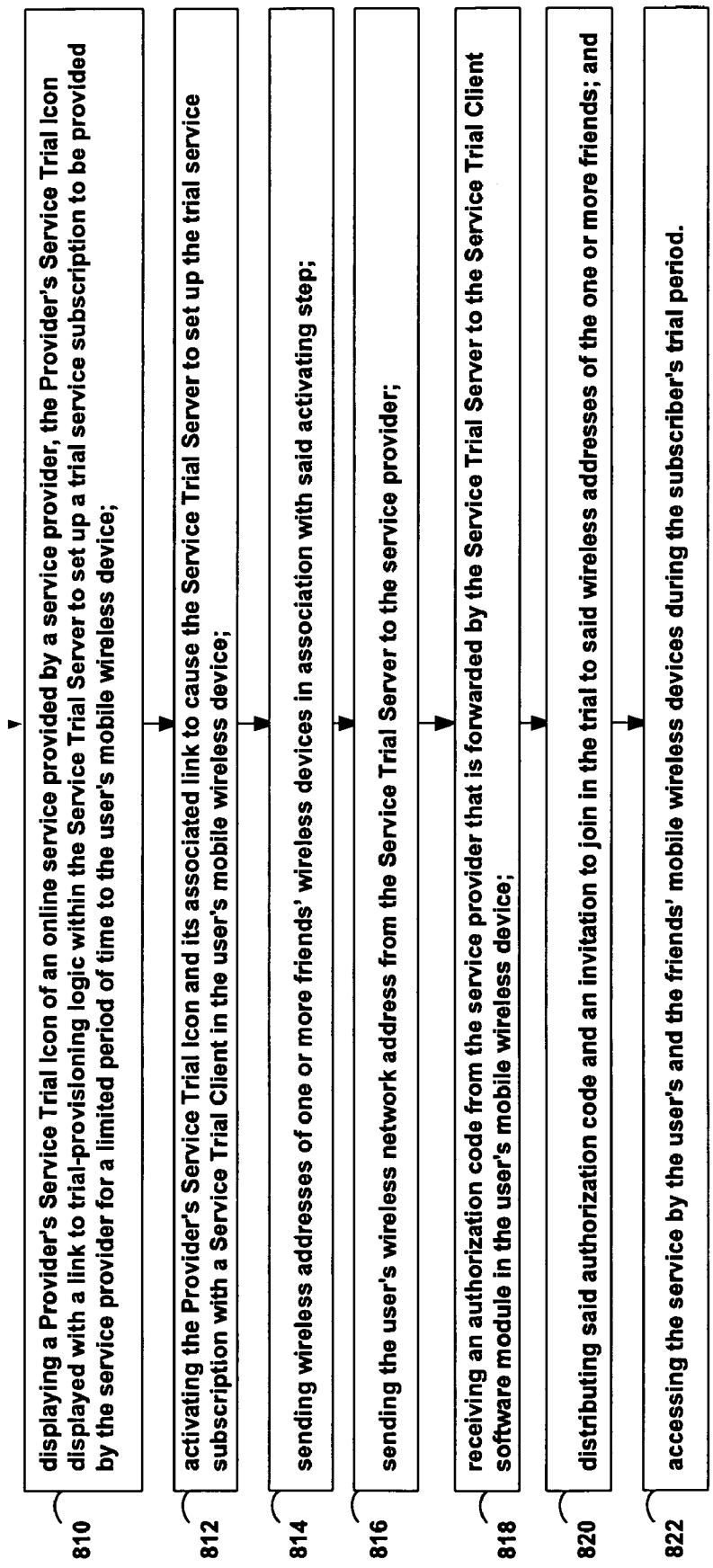

FIG. 8

Flow Diagram for providing a trial online service accessible by a plurality of mobile wireless devices 810 — displaying a Provider's Service Trial Icon of an online service provided by a service provider, the Provider's Service Trial Icon displayed with a link to trial-provisioning logic within the Service Trial Server to set up a trial service subscription to be provided by the service provider for a limited period of time to the user's mobile wireless device;

812 — activating the Provider's Service Trial Icon and its associated link to cause the Service Trial Server to set up the trial service subscription with a Service Trial Client in the user's mobile wireless device;

814 — sending wireless addresses of one or more friends' wireless devices in association with said activating step;

816 — sending the user's wireless network address from the Service Trial Server to the service provider;

818 — receiving an authorization code from the service provider that is forwarded by the Service Trial Server to the Service Trial Client software module in the user's mobile wireless device;

820 — distributing said authorization code and an invitation to join in the trial to said wireless addresses of the one or more friends; and 822 — accessing the service by the user's and the friends' mobile wireless devices during the subscriber's trial period.

SERVICE TRIAL SYSTEM AND METHOD FOR INDIVIDUALS AND COMMUNITIES

FIELD OF THE INVENTION

The invention disclosed broadly relates to the field of service discovery, service trial either by an individual or a community and person to person marketing of services using wireless mobile communication technology.

BACKGROUND OF THE INVENTION

The ubiquitous mobile wireless devices that communicate over cellular telephone networks, wireless LAN networks, and/or Bluetooth networks, enable large portions of the public to easily communicate with one another. The prevalence of mobile wireless devices offers promotional opportunities to businesses to attract customers among the wirelessly-communicating public. Consumer-oriented businesses sell a wide variety of services online to individual customers. The enterprising consumer-oriented business owner can promote their business by attracting members of the wirelessly-communicating public with free trial offers of online services. The business can make a promotional offer to potential customers of membership in an online club or organization sponsored by the business, which features free trials of online services for a limited period of time.

The problem is how to gather enough interested customers to become members of the online club to justify the time, effort, and expense that must be expended by the business to show a profit from the promotion. A corollary to this problem is how do new members of the wirelessly-communicating public discover the online services that are available. A further problem is how does the business monitor the duration of trial membership for individual customers so that the customer can be offered the service for a fee after the trial period expires.

SUMMARY OF THE INVENTION

In accordance with one embodiment of the invention, the enterprising business provides an interactive online service, that will be useful to interested members of the wirelessly-communicating public, by providing to them a medium to discuss and collaborate amongst themselves via their mobile wireless devices about topics of interest that are related to the services that the service provider sells online. Online communities of wireless users can interactively share their individual, real-time observations to build up a body of commonly accessible online information. Such online communities benefit from the addition of new members to increase the coverage and accuracy of the online body of information they gather. The invention enables an enterprising business to exploit this natural desire of such online communities to attract new members. Examples of business ventures that can benefit from the invention include an online provider of highway traffic reports, a ski equipment shop sponsoring online reports of skiing conditions, and a surfing equipment shop sponsoring online reports of local surfing conditions. The invention enables the service provider to promote its business by attracting new members from the wirelessly-communicating public with free trial subscriptions to the service for a limited period of time. In this manner, there is an affinity and loyalty developed in the new members toward the service provider, which will ultimately result in online purchases of services or goods from the service provider after the period of the free trial service expires. In accordance with an embodiment of the invention, the trial subscription is shared by the new member with friends, who will also enjoy the free trial service for a limited period of time, thereby enabling the service provider to attract a larger number of potential customers.

In accordance with another embodiment of the invention, mobile wireless devices have a Service Trial Client software module embedded in them at the time of their manufacture or later by downloading. The Service Trial Client includes an icon that is displayed on the mobile wireless device with a link to a Service Trial Server. When activated by the device's user, the link wirelessly connects the mobile wireless device to the Service Trial Server and downloads from the server a general catalog of available online services, such as a highway traffic monitoring service for motorists.

For each available online service listed in the catalog, at least one, and optionally two, icons associated with the service provider of the service are presented. A Service Trial icon is displayed on the mobile wireless device with a link to trial-provisioning logic within the Service Trial Server to set up the trial service subscription to be provided by the service provider for a limited period of time for the user's mobile wireless device. Optionally, a second icon is displayed on the mobile wireless device with a direct link to the service provider to set up a normal, paid-subscription service to be provided by the service provider to the user's mobile wireless device.

In accordance with a further embodiment of the invention, the Service Trial Server includes a database for each service provider employing the server for providing trial services to the wirelessly-communicating public. A service provider's database in the Service Trial Server includes a record for each trial service subscriber to the service provider's service. Each subscriber record includes the subscriber's wireless network address, the expiration date for the subscriber's trial period, and, optionally, the wireless network addresses of friends who will share the trial service.

During the provisioning phase, when the trial service subscriber applies for the trial subscription, the Service Trial Server sends the subscriber's wireless network address to the service provider, which replies with an authorization code that is optionally stored in the subscriber's record. The authorization code is forwarded by the Service Trial Server to the Service Trial Client software module in the user's mobile wireless device. If the trial service subscriber has added the wireless addresses of one or more friends, the authorization code is forwarded by the Service Trial Server to each of the named friends along with an invitation to join in the free trial service. If a friend accepts the invitation, a notice is sent to the trial service subscriber that the friend has joined in the trial. The friend can access the service on the same basis as can the trial service subscriber.

In accordance with another embodiment of the invention, there are two ways that the trial service subscriber's mobile wireless device can access the service during the subscriber's trial period. The first way is by the subscriber's mobile wireless device directly addressing the service provider over the wireless network and sending the subscriber's authorization code. The service provider will send a query including the subscriber's wireless address and authorization code to the Service Trial Server, which will check the subscriber's record to confirm that the subscriber's trial period has not expired. The Service Trial Server then responds to the service provider whether the subscriber is still within the trial period, and if so, the service provider then proceeds to provide the service to the subscriber. If the subscriber's trial period has expired, then the Service Trial Server sends a message directly to the trial service subscriber and the friends listed in the subscriber's record to subscribe to the service provider's normal paid-subscription service at the end of the trial period.

The second way that the trial service subscriber's mobile wireless device can access the service during the subscriber's trial period is send the request for the service to the Service Trial Server. If the subscriber's record shows that the subscriber's trial period has not expired, then the Service Trial Server sends a message to the service provider including the subscriber's wireless address and authorization code, authorizing the service provider to provide the service to the subscriber.

Monitoring logic is included in the Service Trial Server to review the record of each trial service subscriber on a periodic basis and to prompt the trial service subscriber and the friends listed in the record to subscribe to the service provider's normal paid-subscription service at the end of the trial period.

When the subscriber's record includes the wireless network addresses of the subscriber's friends who will share the trial service, logic in the Service Trial Server sends the friends' wireless network addresses to the service provider along with the subscriber's wireless address and authorization code. In accordance with another embodiment of the invention, there are two ways that the authorization code is forwarded to the Service Trial Client software module in the friends' mobile wireless devices. The first way that the authorization code is forwarded to the Service Trial Client software module in the friends' mobile wireless devices is by the Service Trial Server addressing the friends' mobile wireless devices and sending the authorization code and an invitation to a free subscription to the service.

The second way that the authorization code is forwarded to the Service Trial Client software module in the friends' mobile wireless devices is by the subscriber's mobile wireless device directly addressing the friends' mobile wireless devices and sending the authorization code and an invitation to a free subscription to the service. The friends who choose to participate in the trial subscription can make their request for service in the same manner as does the original trial subscriber.

In accordance with another embodiment of the invention, where a friend's mobile wireless device does not include the Service Trial Client software module, the subscriber can send a copy over the wireless network for downloading on the friend's device.

The resulting invention provides a complete over-the-air service trial and subscription tool that integrates discovery, trial, and subscription functions for online services. It enables a free trial period based on the service provider's specification, it enables person-to-person advertising of the service and communal trial and subscription to the service, and it enables prompting existing subscribers about new services.

DESCRIPTION OF THE FIGURES

FIG. 1 is a network diagram according to an embodiment of the present invention with mobile wireless devices having a Service Trial Client software module embedded in them that includes an icon with a link to enable wirelessly connecting to a Service Trial Server.

FIG. 2B is a functional block diagram of the Service Trial Client according to an embodiment of the present invention, which includes the service trial icon and its link to download a general catalog of available services from the Service Trial Server, a first service trial token to service provider "A", and a second service trial token to service provider "B".

FIG. 2C is a functional block diagram of the Service Trial Server according to an embodiment of the present invention, which shows the database for the first service provider "A" and the database for the second service provider "B".

FIG. 2D is a functional block diagram of the Service Provider "A" according to an embodiment of the present invention, which shows the public and private keys used to interact with the service trial clients and the service trial server.

FIG. 3A illustrates an example browser display of the Service Trial icon in the Service Trial client and its link to download a general catalog of available online services from the Service Trial Server according to an embodiment of the present invention.

FIG. 3B illustrates the general catalog of available online services downloaded from the Service Trial Server, which includes a Provider's Service Trial Icon with a link to the Service Trial Server to set up the trial, according to an embodiment of the present invention.

FIG. 3C illustrates an example browser display of an alternate, Provider's Service Trial icon displayed on the service provider's web page menu with a link to the Service Trial Server to directly set up the trial, according to another embodiment of the present invention.

FIG. 4 is a generalized data flow diagram of an embodiment of the present invention.

FIG. 5A is a flow diagram for providing a trial online service accessible by a plurality of mobile wireless devices according to an embodiment of the present invention.

FIG. 5C is a flow diagram for the user's friend accessing the trial service according to an embodiment of the present invention.

FIG. 6B is a network diagram according to an embodiment of the present invention illustrating the step in service discovery, of the Service Trial Server downloading a general catalog of available online services, such as a highway traffic monitoring service, a skiing condition reports service, and a surfing conditions report service.

FIG. 6D is a network diagram according to an embodiment of the present invention illustrating the step in provisioning, of the user sending to the Service Trial Server the addresses of friends whom the user would like to include in the trial of the service.

FIG. 6G is a network diagram according to an embodiment of the present invention illustrating the step in superdistribution, of the Service Trial Server forwarding to each of the named friends the authorization code and an invitation to join the user in the free trial service.

FIG. 7F is a network diagram according to an embodiment of the present invention illustrating the step after expiration of the trial service, of the Service Trial Server sending a message directly to the user inviting the user to subscribe to the service provider's normal paid-subscription service at the end of the trial period.

FIG. 7G is a network diagram according to an embodiment of the present invention illustrating the step after expiration of the trial service, of the Service Trial Server sending a message directly to the user's friends inviting them to subscribe to the service provider's normal paid-subscription service at the end of the trial period.

FIG. 8 is a flow diagram for providing a trial online service accessible by a plurality of mobile wireless devices according to another embodiment of the present invention.

DISCUSSION OF THE PREFERRED EMBODIMENT

Figure 2A:
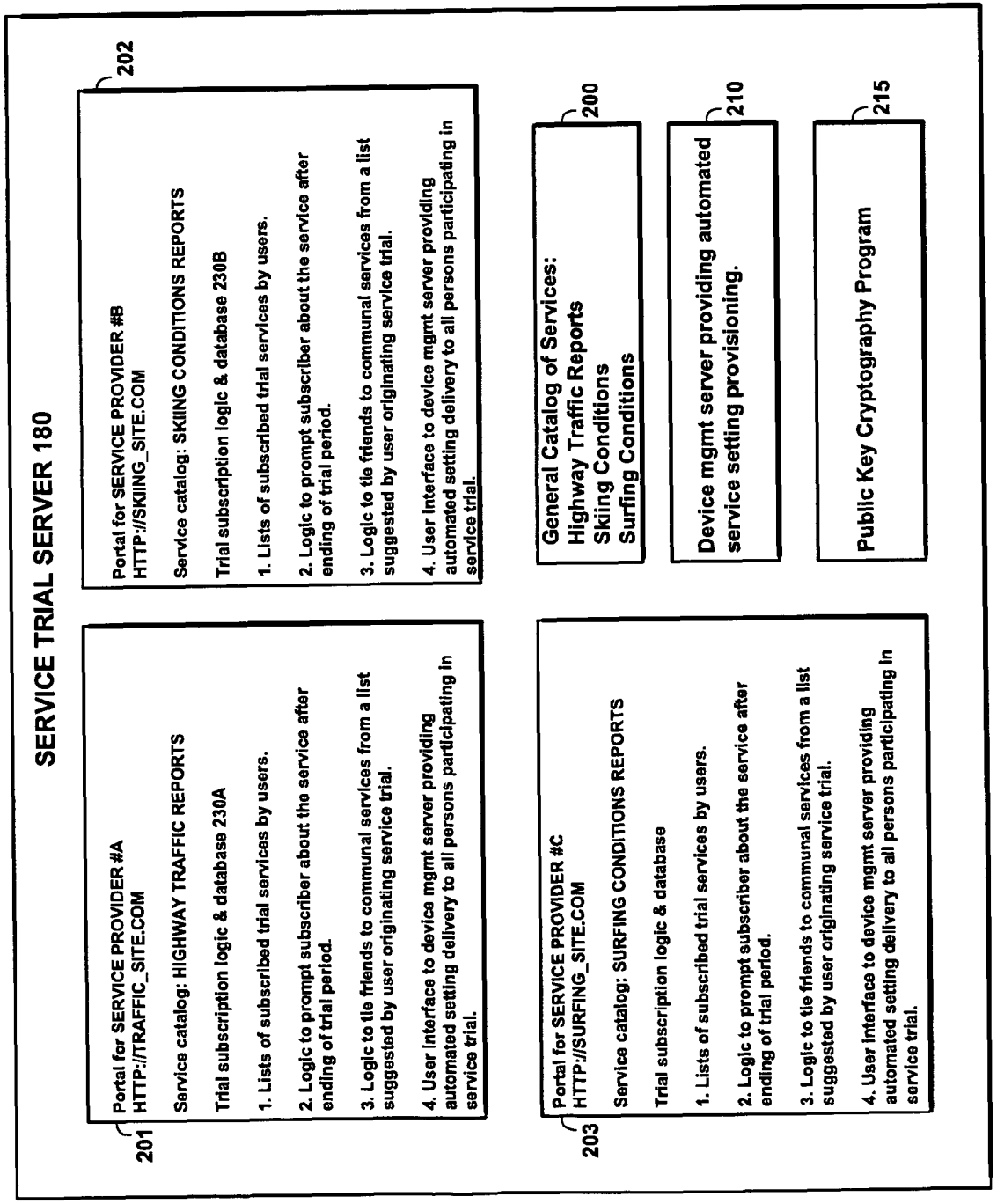
FIG. 2A is a functional block diagram of the Service Trial Server according to an embodiment of the present invention, which includes a database for each service provider, a general catalog of services provided by all of the service providers, and a device management server to provide automated provisioning of trial services.

An online, highway traffic monitoring service is an example of a service that is based on having a critical mass of members in an online community. The example provider of the service prepares online reports on automotive traffic congestion and hazards in a geographic region. Revenue for the service provider is derived from motorists subscribing to the reporting service, which allows them to access its traffic reports via their mobile wireless devices. Real-time information about automotive traffic congestion and hazards is provided by the subscriber motorists, themselves, who call or send messages the service provider and describe their on-the-scene observations, which are then compiled by the service provider into the traffic reports accessible to all subscribers. The accuracy and timeliness of the traffic reports depend on having a large number of subscribers. The service provider promotes its business by attracting new members of the wirelessly-communicating public with free trial offers of the service for a limited period of time. Motorists who participate in the free trial of the service and existing subscribers, as well, are interested in enlarging the membership in order to maximize the accuracy and timeliness of the traffic reports.

FIG. 1 is a network diagram according to an embodiment of the present invention, which enables the service provider "A" 190 to promote its business by attracting new members of the wirelessly-communicating public with free trial offers of the service of highway traffic reports for a limited period of time. The invention enables the service provider 190 to give a free trial of the service to the user and the user's friends via their mobile wireless devices 100 and 100', respectively. The mobile wireless devices 100 and 100' are able to communicate over three example types of wireless networks in FIG. 1: a Bluetooth personal area network, an IEEE 802.11 wireless LAN network, and/or a GSM cellular telephone network. The Internet 144 is connected to a Bluetooth wireless access point 140A, an IEEE 802.11 wireless LAN network access point 140B, and an Internet gateway 188 that is connected to a GSM base station 186. The Bluetooth access point 140A has a corresponding personal area network coverage area 150A with a radius of ten meters. The IEEE 802.11 Wireless LAN access point 140B has a corresponding typical coverage area 150B with a radius of one hundred meters. The GSM base station 186 has a corresponding typical coverage area with a radius of several kilometers.

The user's wireless device 100 in FIG. 1 has a microbrowser 102, a keypad 104, GSM antenna 101, Bluetooth antenna 103, and WLAN antenna 105. In accordance with an embodiment of the invention, the mobile wireless device 100 has a Service Trial Client software module 106 embedded in it at the time of its manufacture or later by downloading. The Service Trial Client 106 includes a service trial icon 120 that is displayed on the mobile wireless device 100 with an HTTP link to a Service Trial Server 180. When activated by the device's user, the link wirelessly connects the mobile wireless device 100 over the internet 144 to the Service Trial Server 180 and downloads from the server 180 a general catalog of available online services 200, such as a highway traffic monitoring service for motorists. FIG. 1 also shows the wireless device 100' belonging to the friend of the user. Wireless device 100' is similar to the user's wireless device 100, as described above, and also includes a Service Trial Client software module 106' embedded in it at the time of its manufacture or later by downloading.

FIG. 1 also shows two other service providers connected to the internet 144. Service provider "B" 192 provides reports of skiing conditions. Real-time information about skiing conditions is provided by the subscriber skiers, themselves, who call or send messages to the service provider 192 and describe their on-the-scene observations, which are then compiled by the service provider 192 into the skiing condition reports accessible to all subscribers. The accuracy and timeliness of the skiing reports depend on having a large number of subscribers. The service provider 192 promotes its business by attracting new members of the wirelessly-communicating public with free trial offers of the service for a limited period of time. Service provider "C" 194 provides reports of surfing conditions. Real-time information about surfing conditions is provided by the subscriber surfers, themselves, who call the service provider 194 and describe their on-the-scene observations, which are then compiled by the service provider 194 into the surfing condition reports accessible to all subscribers. The accuracy and timeliness of the surfing reports depend on having a large number of subscribers. The service provider 194 promotes its business by attracting new members of the wirelessly-communicating public with free trial offers of the service for a limited period of time.

FIG. 2A is a functional block diagram of the Service Trial Server 180 according to an embodiment of the present invention, which includes a portal 201, 202, and 203 for each respective service providers 190, 192, and 194. The Service Trial Server 180 includes a general catalog of services 200 provided by all of the service providers, a device management server 210 to provide automated provisioning of trial services, and a public key cryptography program 215 to manage the secure transfer of subscriber information.

Each Service providers portal 201, 202, and 203 contains:
  i. Service catalogues.
  ii. Trial subscription logic & database 230A, 230B, and 230C, respectively:
    1. Lists of subscribed trial services by users.
    2. Logic to prompt subscriber about the service after ending of trial period.
    3. Logic to tie friends to communal services from a list suggested by user originating service trial.
    4. User interface to device management server providing automated setting delivery to all persons participating to service trial.

FIG. 2B is a functional block diagram of the Service Trial Client 106 according to an embodiment of the present invention, which includes the service trial icon 120 and its HTTP internet link to the Service Trial Server 180, a first service trial token 220A to service provider "A", a second service trial token 220B to service provider "B", and the private and public keys Pr01 and Pu01, respectively, of the service trial client 106. The a first service trial token 220A stores the internet URL address of the service provider "A" 190, the authorization number "01A" issued to the user's device 100 by the service provider "A" 190 for the trial service, and the public key "PuA" of the service provider "A" 190. The a second service trial token 220B stores the internet URL address of the service provider "B" 192, the authorization number "01B" issued to the user's device 100 by the service provider "B" 192 for a second trial service, and the public key "PuB" of the service provider "B" 192. The public key Pu01 of the service trial client 106 is used by senders, such as the service provider "A" 190 to encrypt messages that can only be decrypted by the service trial client 106 using the matched private key Pr01. The service trial client 106 can freely distribute its public key Pu01 to recipients, such as the service trial server 180 and the service provider "A" 190, allowing them to securely send messages to the service trial client 106. The public key Pu01 and private key Pr01 of the service trial client 106 can be generated within the service trial client 106 using, a public key cryptographic program, for example, RSA public key cryptography. RSA uses public and private keys that are functions of a pair of large prime numbers, which can be used both for encrypting messages and making digital signatures.

Each the Service Trial Client 106 and 106':
  1) Provides single user interface for all service providers' service catalogs.
  2) Has an icon on terminal menu providing to link to service providers web page.
  3) Is either embedded at the factory or downloaded later.
  4) Can be superdistributed among the user's friends.
  5) Is a complete over-the-air service trial and subscription tool integrating discovery, trial and subscription.
  6) Is operator brandable, supporting flexible business models.
  7) Provides the option to include list of friends in communal services.

FIG. 2C is a functional block diagram of the Service Trial Server 180 according to an embodiment of the present invention, which shows the portal 201 and the database 230A for the first service provider "A", the portal 202 and the database 230B for the second service provider "B", and the private and public keys PrSVR and PuSVR, respectively, of the service trial Server 180 in the key register 214. The Service Trial Server 180 includes a database 230A and 230B for each service provider 190 and 192, respectively, employing the server 180 for providing trial services to the wirelessly-communicating public. The service provider "A" 190's database 230A in the Service Trial Server 180 includes a record for each trial service subscriber to the service provider's service. Each subscriber record includes the subscriber's wireless network address, the authorization code or number "01A" issued, for example, to the user's device 100 by the service provider "A" 190 for the trial service, the expiration date for the subscriber's trial period, the wireless network addresses of the subscriber's friends who will share the trial service, the public key of the subscriber and the public key of the subscriber's friends. FIG. 2C shows the database 230A with one column for one friend of the subscriber's, but a plurality of friends can be identified by the subscriber and their identities stored in the database 230A. For example, the record in database 230A for the user's wireless device 100 includes the wireless address "0001" for device 100, the authorization code or number "01A" issued to the user's device 100 by the service provider "A" 190 for the trial service, the wireless address "0007" for the friend's wireless device 100', the public key "Pu01" of the user's device 100 and the public key "Pu07" of the user's friend's device 100'.

FIG. 2D is a functional block diagram of the Service Provider "A" 190 according to an embodiment of the present invention, which shows the public and private keys used to interact with the service trial clients 106 and the service trial server 180. In addition to the various content servers in the Service Provider "A" 190 to provide the Highway Traffic Reporting service, the server 190 stores the following keys: provider "A" public key=PuA, provider "A" private key=PrA, server's public key=PuSVR, user's public key=Pu01, friend's public key=Pu07, 2nd user's public key=Pu02, 2nd user's friend's public key=Pu08, 3rd user's public key 5=Pu03, and 3rd user's friend's public key=Pu09.

FIG. 3A illustrates an example browser display of the Service Trial icon 120 in a desktop main menu 240 displayed on the mobile wireless device 100 with a link to a Service Trial Server 180. When activated by the device's user, the link for the icon 120 wirelessly connects the mobile wireless device 100 to the Service Trial Server 180 and downloads from the server 180 a general catalog of available online services 200.

FIG. 3B illustrates the general catalog of available online services 200 downloaded from the Service Trial Server 180, which includes a Provider's Service Trial Icon 244 with a link to the Service Trial Server 180 to set up the trial, according to an embodiment of the present invention.

FIG. 3C illustrates an example browser display of an alternate, Provider's Service Trial icon 244' displayed on the service provider's web page menu 242 with a link to the Service Trial Server to directly set up the trial, according to another embodiment of the present invention. Since the user is viewing the service provider's menu 242 on the service provider's web site, the activation of Provider's Service Trial icon 244' bypasses the accessing of the general catalog 200 and invokes the Service Trial Server 180 to directly set up the provider's trial service.

FIG. 4 is a generalized data flow diagram of an embodiment of the present invention. The user, named Bob, has a new wireless device 100 with the service trial client 106. Bob opens the client 106, activates the Service Trial icon 120, downloads the general catalog of available services 200, and selects the provider's service. The Service Trial Server 180 then sets up or provisions a one month free trial of service from the service provider 190, using the device management server 210. The Service Trial Server 180 prompts the wireless devices 100' of friends chosen by Bob to share the service trial. The Service Trial Server 180 sends the service settings to Bob's device 100 and his friends' devices 100' and sends a notice to Bob when his friends have accepted the trial service.

FIG. 5A is a flow diagram of steps for providing a trial online service accessible by a plurality of mobile wireless devices according to an embodiment of the present invention. The steps of the flow diagram represent programmed sequences of operational instructions which, when executed by computer processors, for example, in the user's wireless device 100, in the user's friend's wireless device 100', in the Service Trial Server 180, and in the service provider 190, carry out the methods of the invention.

The steps of the flow diagram of FIG. 5A are as follows:

Step 502: storing a Service Trial Client software module in a user's mobile wireless device.

Step 504: displaying a service trial icon in the mobile wireless device with a link to a Service Trial Server.

Step 506: wirelessly connecting the mobile wireless device to the Service Trial Server when the link is activated.

Step 508: wirelessly downloading to the mobile wireless device from the Service Trial Server a general catalog of available online services.

Step 510: displaying a Provider's service trial icon of an online service listed in the catalog associated with a service provider of an online service, the Provider's service trial icon displayed with a link to trial-provisioning logic within the Service Trial Server to set up a trial service subscription to be provided by the service provider for a limited period of time to the user's mobile wireless device.

Step 512: activating the provider's service trial icon and its associated link to set up a trial service subscription to be provided by the service provider.

Step 514: sending wireless addresses of one or more friends' wireless devices in association with said activating step.

Step 516: sending the user's wireless network address from the Service Trial Server to the service provider.

Step 518: receiving an authorization code from the service provider that is forwarded by the Service Trial Server to the Service Trial Client software module in the user's mobile wireless device.

Step 520: distributing said authorization code and an invitation to join in the trial to said wireless addresses of the one or more friends.

Step 522: accessing the service by the user's and the friends' mobile wireless devices during the subscriber's trial period.

Figure 5B:
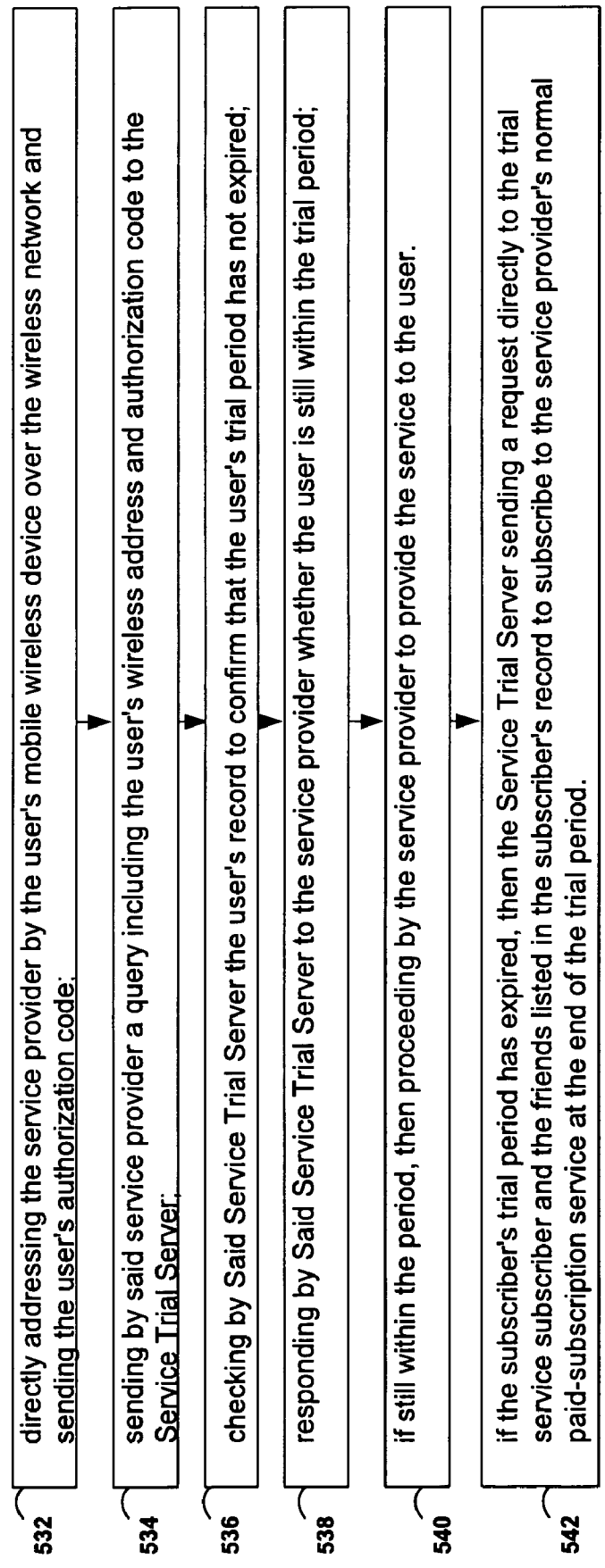
FIG. 5B is a flow diagram for the user accessing the trial service according to an embodiment of the present invention.

FIG. 5B is a flow diagram for the user accessing the trial service during the trial period, according to an embodiment of the present invention. The steps of the flow diagram represent programmed sequences of operational instructions which, when executed by computer processors, for example, in the user's wireless device 100, in the user's friend's wireless device 100', in the Service Trial Server 180, and in the service provider 190, carry out the methods of the invention.

The steps of the flow diagram of FIG. 5B are as follows:

Step 532: directly addressing the service provider by the user's mobile wireless device over the wireless network and sending the user's authorization code.

Step 534: sending by said service provider a query including the user's wireless address and authorization code to the Service Trial Server.

Step 536: checking by Said Service Trial Server the user's record to confirm that the user's trial period has not expired.

Step 538: responding by Said Service Trial Server to the service provider whether the user is still within the trial period.

Step 540: if still within the period, then proceeding by the service provider to provide the service to the user.

Step 542: if the subscriber's trial period has expired, then the Service Trial Server sending a request directly to the trial service subscriber and the friends listed in the subscriber's record to subscribe to the service provider's normal paid-subscription service at the end of the trial period.

FIG. 5C is a flow diagram for the user's friend accessing the trial service during the trial period, according to an embodiment of the present invention. The steps of the flow diagram represent programmed sequences of operational instructions which, when executed by computer processors, for example, in the user's wireless device 100, in the user's friend's wireless device 100', in the Service Trial Server 180, and in the service provider 190, carry out the methods of the invention.

The steps of the flow diagram of FIG. 5C are as follows:

Step 552: directly addressing the service provider by the friend's mobile wireless device over the wireless network and sending the user's authorization code and user's wireless address.

Step 554: sending by said service provider a query including the friend's wireless address and user's wireless address and user's authorization code to the Service Trial Server.

Step 556: checking by Said Service Trial Server the user's record to confirm that the user's trial period has not expired.

Step 558: responding by Said Service Trial Server to the service provider whether the user is still within the trial period.

Step 560: if still within the period, then proceeding by the service provider to provide the service to the friend.

Step 562: if the user's trial period has expired, then the Service Trial Server sending a request directly to the user and the friends listed in the user's record to subscribe to the service provider's normal paid-subscription service at the end of the trial period.

Figure 6A:
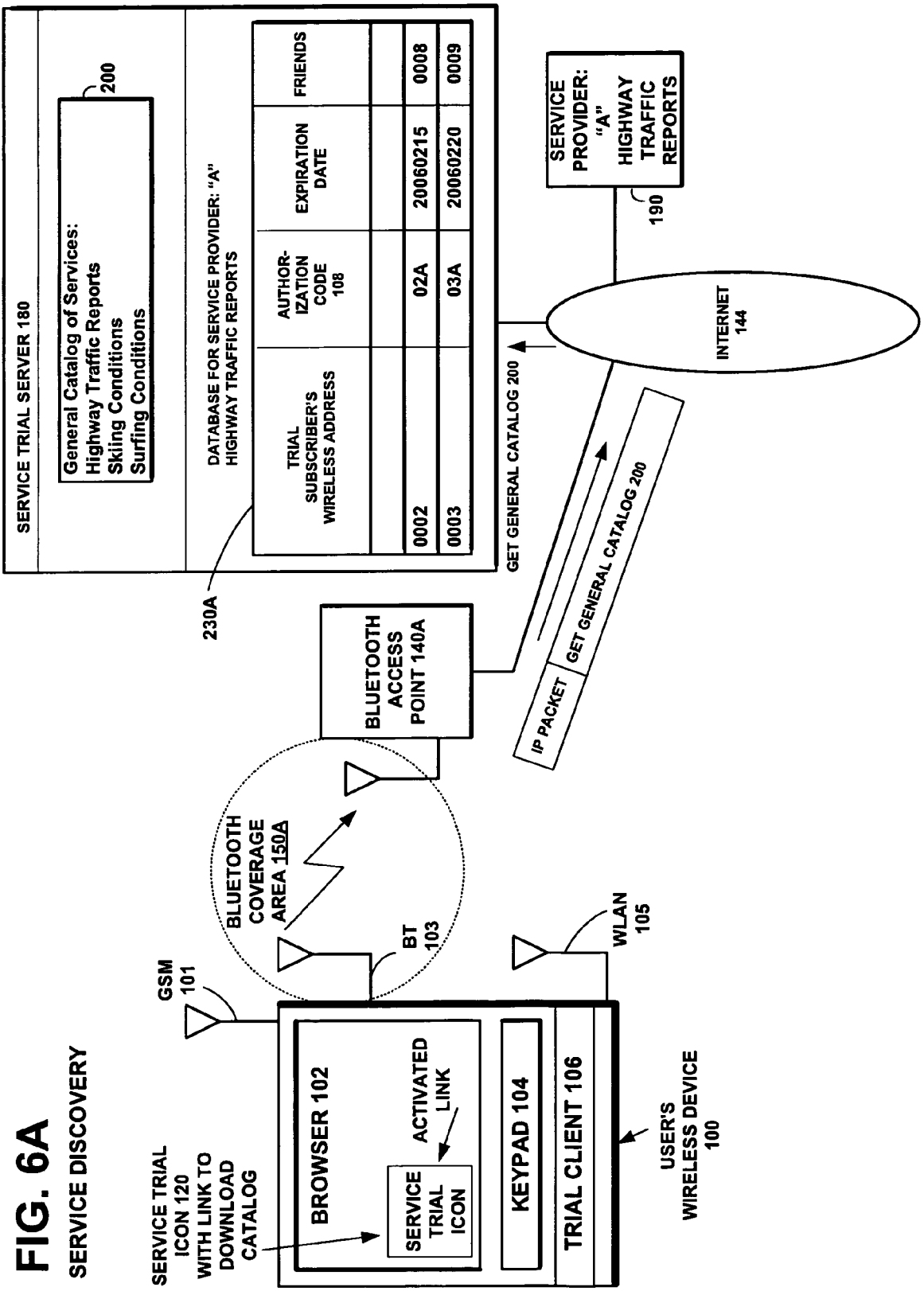
FIG. 6A is a network diagram according to an embodiment of the present invention illustrating the step in service discovery, of the user selecting the service trial icon in the Service Trial Client of the user's device and activating the link to the Service Trial Server, which wirelessly connects the user's mobile wireless device to the Service Trial Server.

FIG. 6A is a network diagram according to an embodiment of the present invention illustrating the step in service discovery, showing the user selecting the service trial icon 120 in the Service Trial Client 106 of the user's device 100 and activating the link to the Service Trial Server 180, which wirelessly connects the user's mobile wireless device 100 over the internet 144 to the Service Trial Server 180, to download the general catalog of available online services 200.

FIG. 6B is a network diagram according to an embodiment of the present invention illustrating the step in service discovery, showing the Service Trial Server 180 downloading over the internet 144 the general catalog of available online services 200, which lists a highway traffic monitoring service, a skiing condition reports service, and a surfing conditions report service.

Figure 6C:
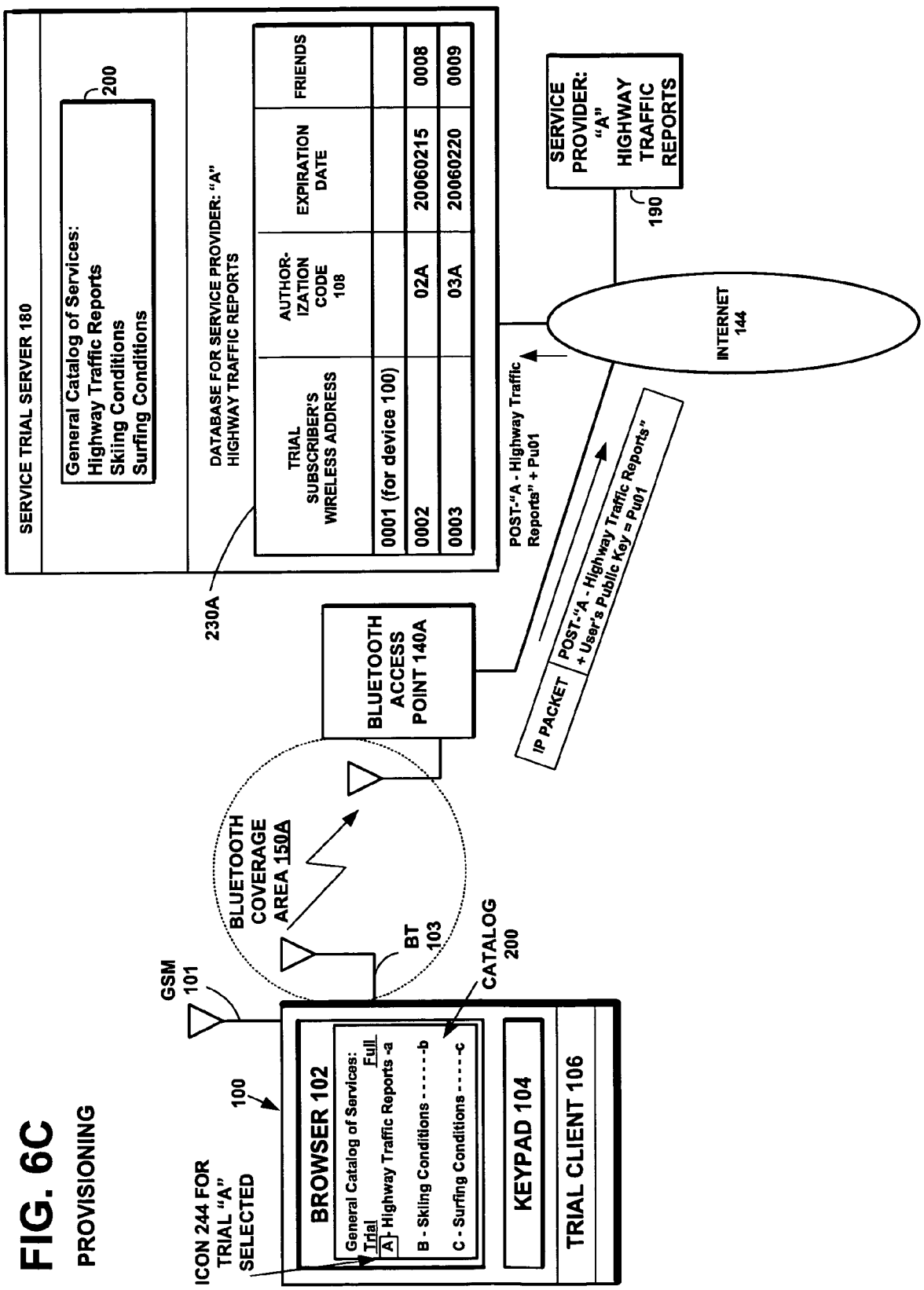
FIG. 6C is a network diagram according to an embodiment of the present invention illustrating the step in provisioning, of the user selecting from the general catalog a Service Trial icon for the highway traffic reports service, which activates a link to trial-provisioning logic within the Service Trial Server to set up the trial service subscription to be provided by the service provider for a limited period of time for the user's mobile wireless device.

FIG. 6C is a network diagram according to an embodiment of the present invention illustrating the step in provisioning, showing the user selecting from the general catalog 200 the Provider's Service Trial Icon 244 for the highway traffic reports service, which activates a link to trial-provisioning logic within the Service Trial Server 180 to wirelessly set up the trial service subscription to be provided by the service provider 180 for a limited period of time for the user's mobile wireless device. The Service Trial Client 106 of the user's device 100 also wirelessly sends the public key Pu01 of the service trial client 106 over the internet 144 to the Service Trial Server 180.

FIG. 6D is a network diagram according to an embodiment of the present invention illustrating the step in provisioning, showing the user wirelessly sending to the Service Trial Server 180 over the internet 144 the addresses of friends whom the user would like to include in the trial of the service. The Service Trial Client 106 of the user's device 100 also wirelessly sends the public key Pu07 of the of the user's friend's wireless device 106' over the internet 144 to the Service Trial Server 180.

Figure 6E:
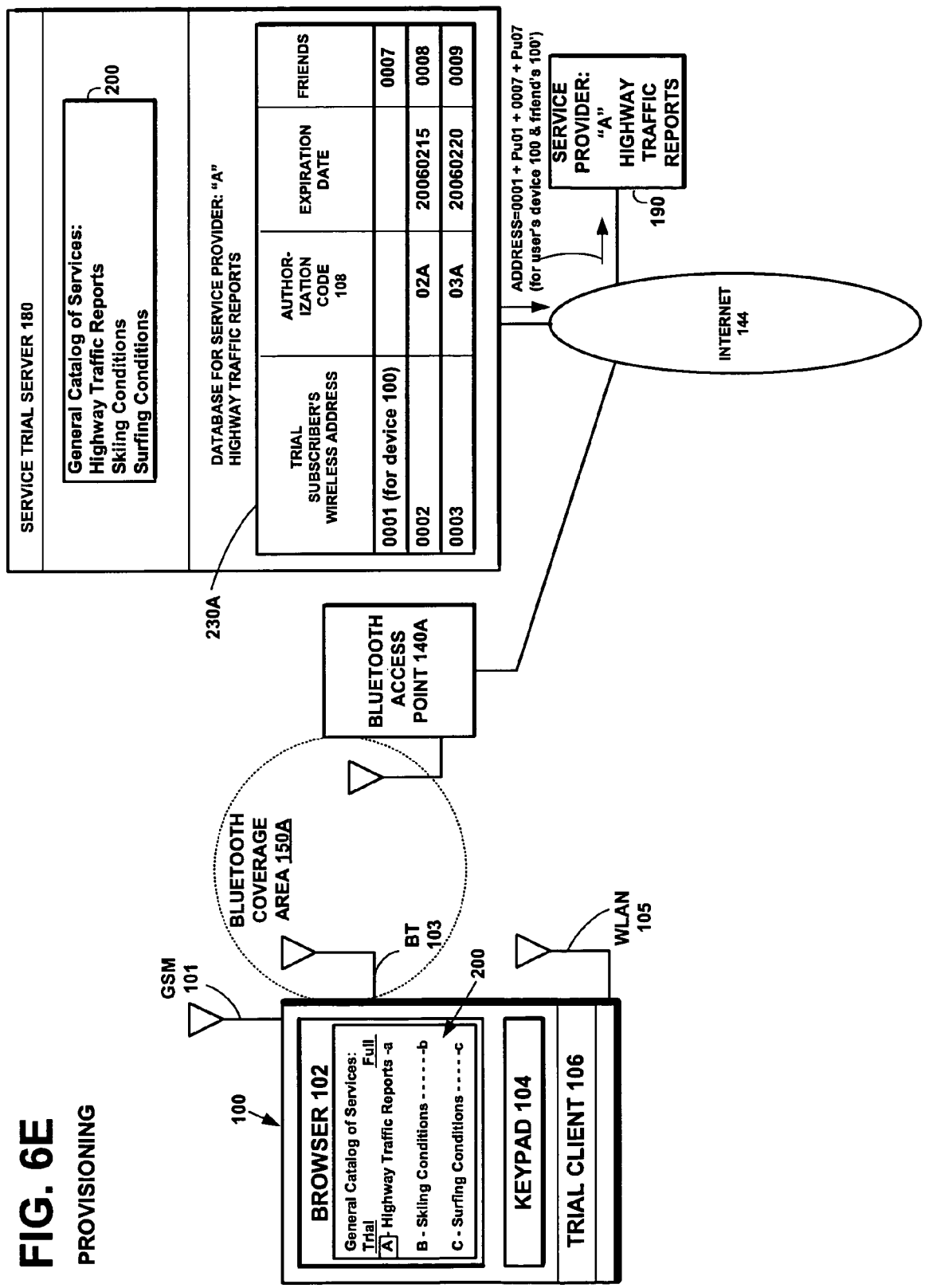
FIG. 6E is a network diagram according to an embodiment of the present invention illustrating the step in provisioning, of the Service Trial Server sending the user's wireless network address to the service provider.

FIG. 6E is a network diagram according to an embodiment of the present invention illustrating the step in provisioning, showing the Service Trial Server 180 sending over the internet 144 the user's wireless network address "0001" to the service provider "A" 190. The Service Trial server 180 also sends the public key Pu01 of the service trial client 106 and the wireless network address "0007" and the public key Pu07 of the of the user's friend's wireless device 100' over the internet 144 to the service provider "A" 190.

Figure 6F:
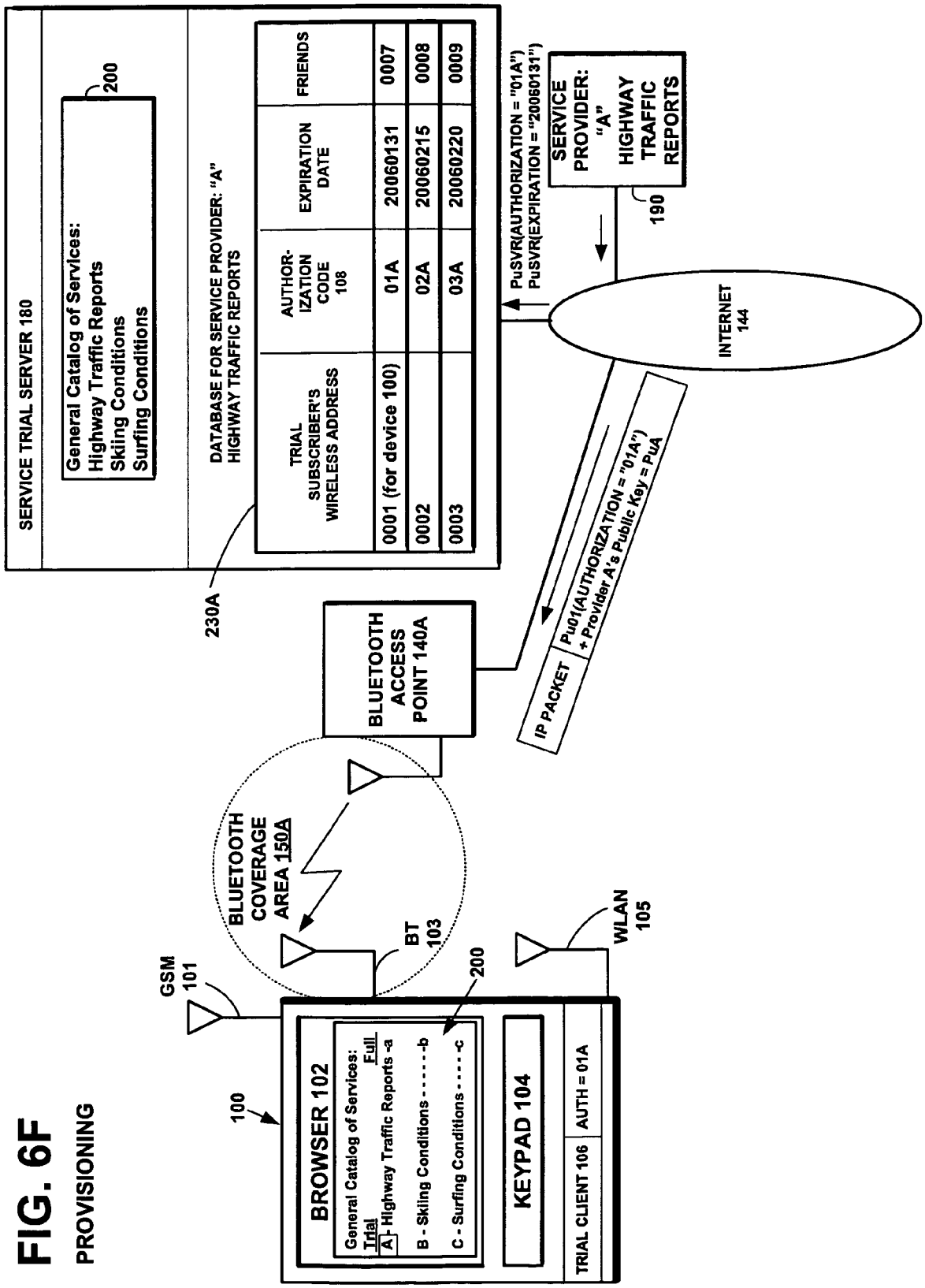
FIG. 6F is a network diagram according to an embodiment of the present invention illustrating the step in provisioning, of service provider replying with an authorization code that is forwarded by the Service Trial Server to the Service Trial Client software module in the user's mobile wireless device.

FIG. 6F is a network diagram according to an embodiment of the present invention illustrating the step in provisioning, showing service provider "A" 190 replying to the Service Trial Server 180 with an authorization code "01A" and an expiration date of "20061031" encrypted with the public key PuSVR of the Service Trial Server 180. The Service Trial Server 180 then forwards the authorization code "01A" encrypted with the public key Pu01 of the user's wireless device 100 to the Service Trial Client software module 106 in the user's mobile wireless device 100. The Service Trial server 180 also sends the public key PuA of the service provider "A" 190 to the Service Trial Client software module 106 in the user's mobile wireless device 100. Alternately, the service provider "A" 190 can send the authorization code "01A" encrypted with the public key Pu01 of the user's wireless device 100 to the Service Trial Client software module 106 in the user's mobile wireless device 100.

FIG. 6G is a network diagram according to an embodiment of the present invention illustrating the step in superdistribution, showing the Service Trial Server 180 forwarding to each of the named friends, such as the friend's wireless device 100', the authorization code "01A" and an invitation to join the user 100 in the free trial service. The Service Trial Server 180 sends the authorization code "01A" encrypted with the public key Pu07 of the friend's wireless device 100' to the Service Trial Client software module 106' in the friend's mobile wireless device 100'. The Service Trial server 180 also sends the public key PuA of the service provider "A" 190 to the Service Trial Client software module 106' in the friend's mobile wireless device 100'.

Figure 6H:
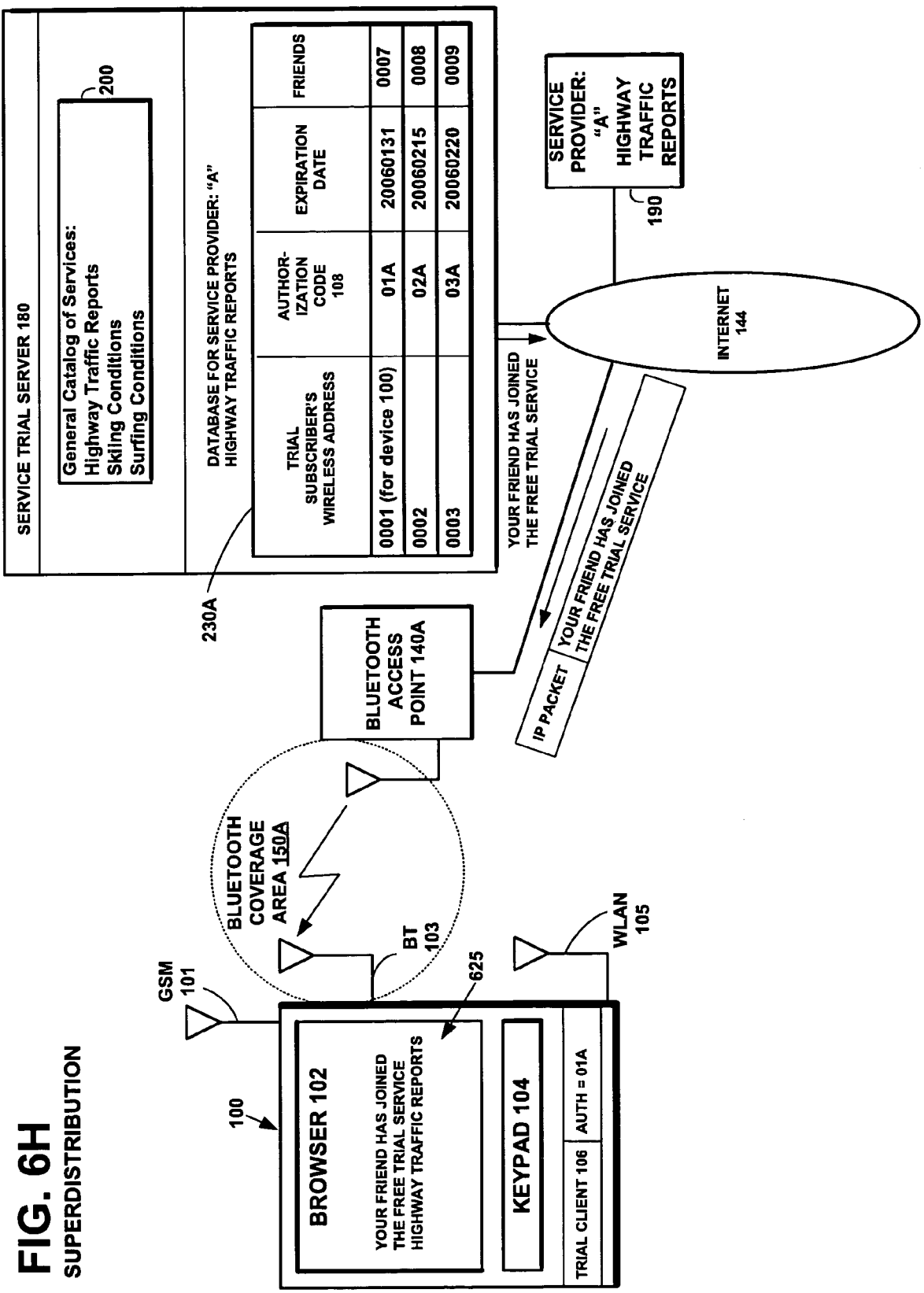
FIG. 6H is a network diagram according to an embodiment of the present invention illustrating the step in superdistribution, of the Service Trial Server sending a notice to the user that the user's friend has joined in the trial.

FIG. 6H is a network diagram according to an embodiment of the present invention illustrating the step in superdistribution, showing the Service Trial Server 180 sending a notice to the user 100 that the user's friend 100' has joined in the trial.

Figure 7A:
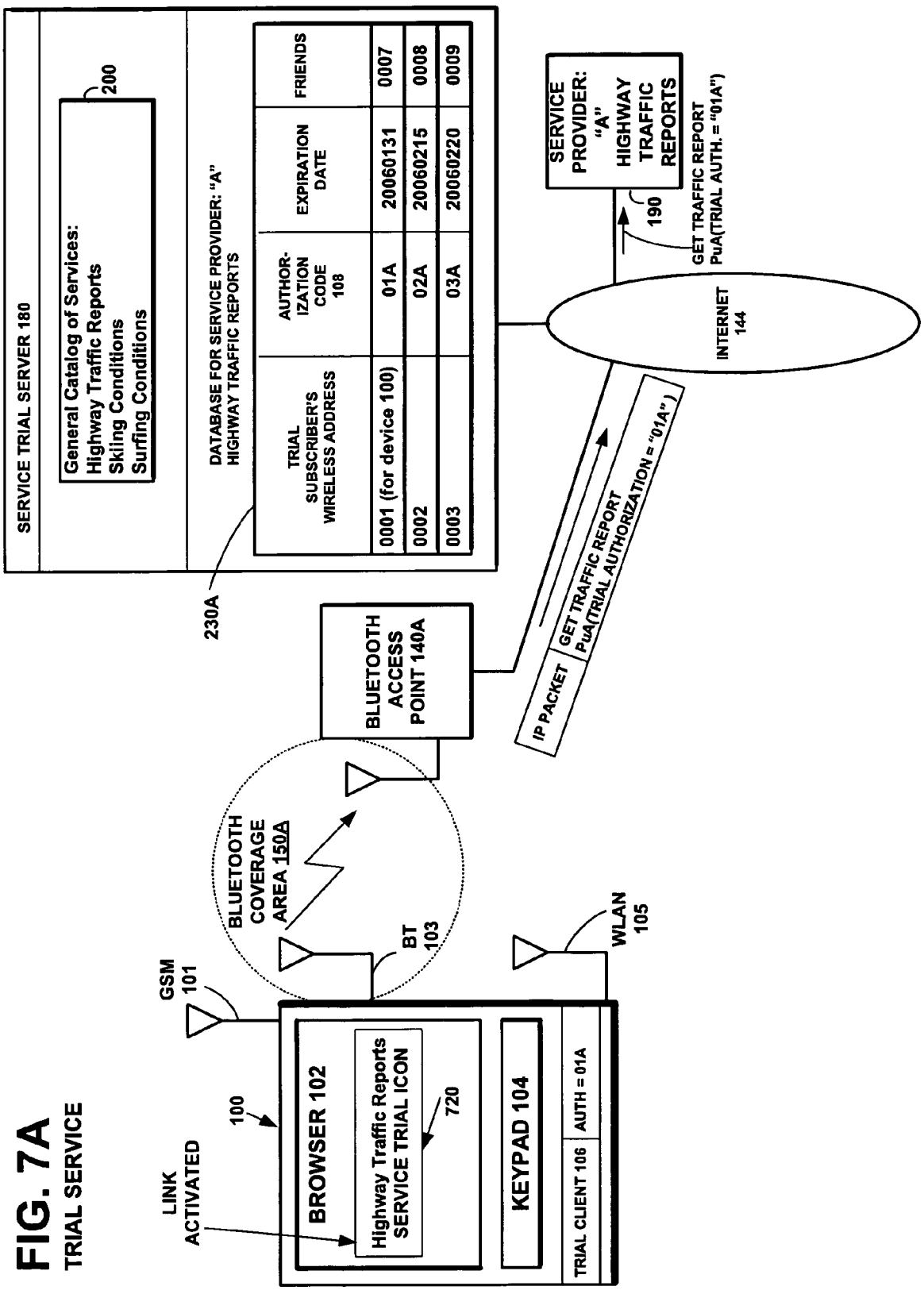
FIG. 7A is a network diagram according to an embodiment of the present invention illustrating the step in the trial service, of the user's mobile wireless device directly addressing the service provider over the wireless network and sending the user's authorization code.

FIG. 7A is a network diagram according to an embodiment of the present invention illustrating the step in the trial service, showing the Service Trial Client software module 106 in the user's mobile wireless device 100 displaying an icon 720 for the service trial of the Highway Traffic Reports service. When the user activates the link associated with icon 720, the user's mobile wireless device 100 directly addresses the service provider "A" 190 over the wireless network and sends a "GET Traffic Report" message and the user's authorization code "01A" encrypted with the public key PuA of the service provider "A" 190.

Figure 7B:
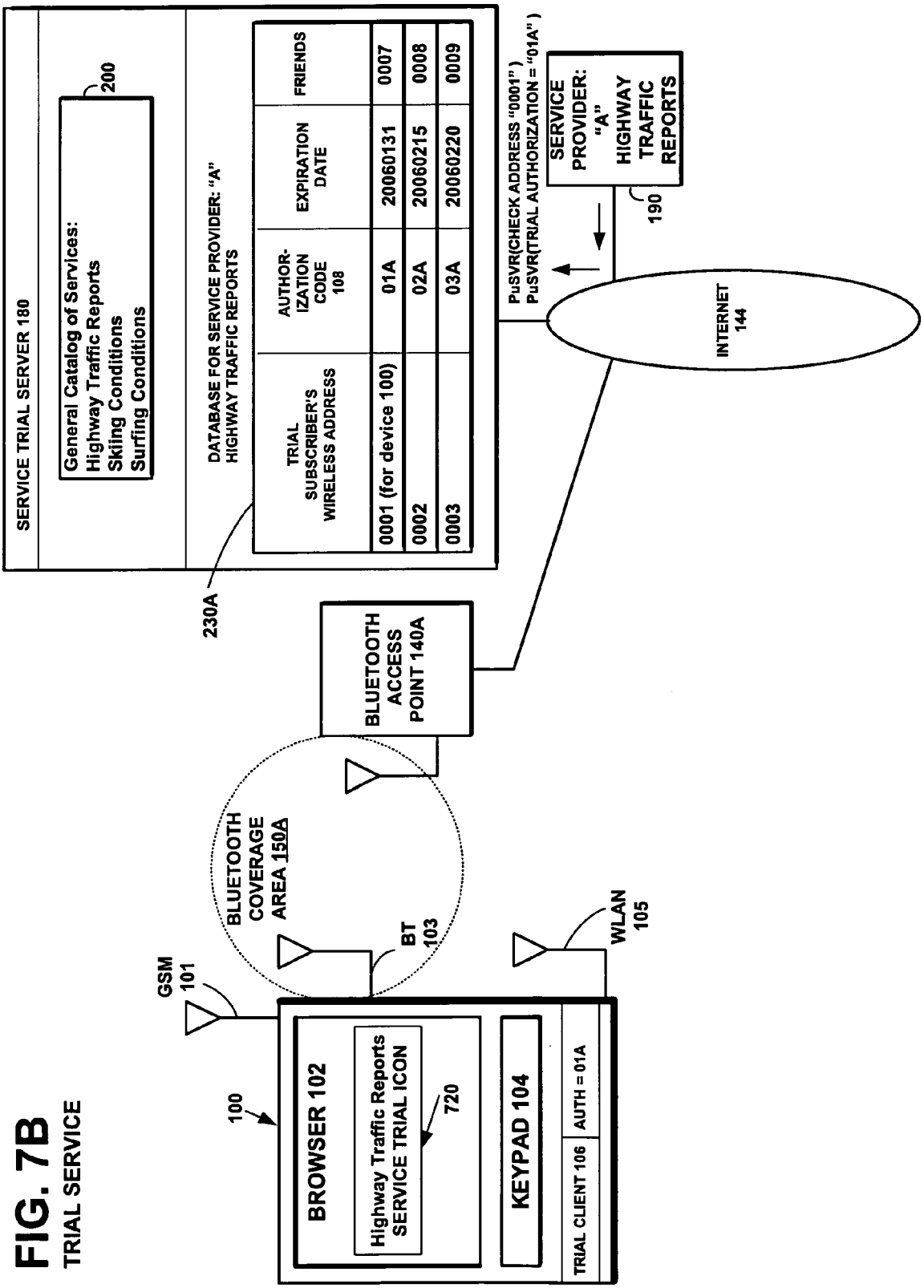
FIG. 7B is a network diagram according to an embodiment of the present invention illustrating the step in the trial service, of the service provider sending a query including the user's wireless address and authorization code to the Service Trial Server, which will check the user's record to confirm that the user's trial period has not expired.

FIG. 7B is a network diagram according to an embodiment of the present invention illustrating the step in the trial service, showing the service provider "A" 190 sending a query including the user's wireless address "0001" and authorization code "01A" encrypted with the public key PuSVR of the Service Trial Server 180, to the Service Trial Server 180 in a request to check whether the trial period is still active corresponding to the user 100 and the authorization code "01A". Service Trial Server 180 will check the user's record to confirm that the user's trial period has not expired.

Figure 7C:
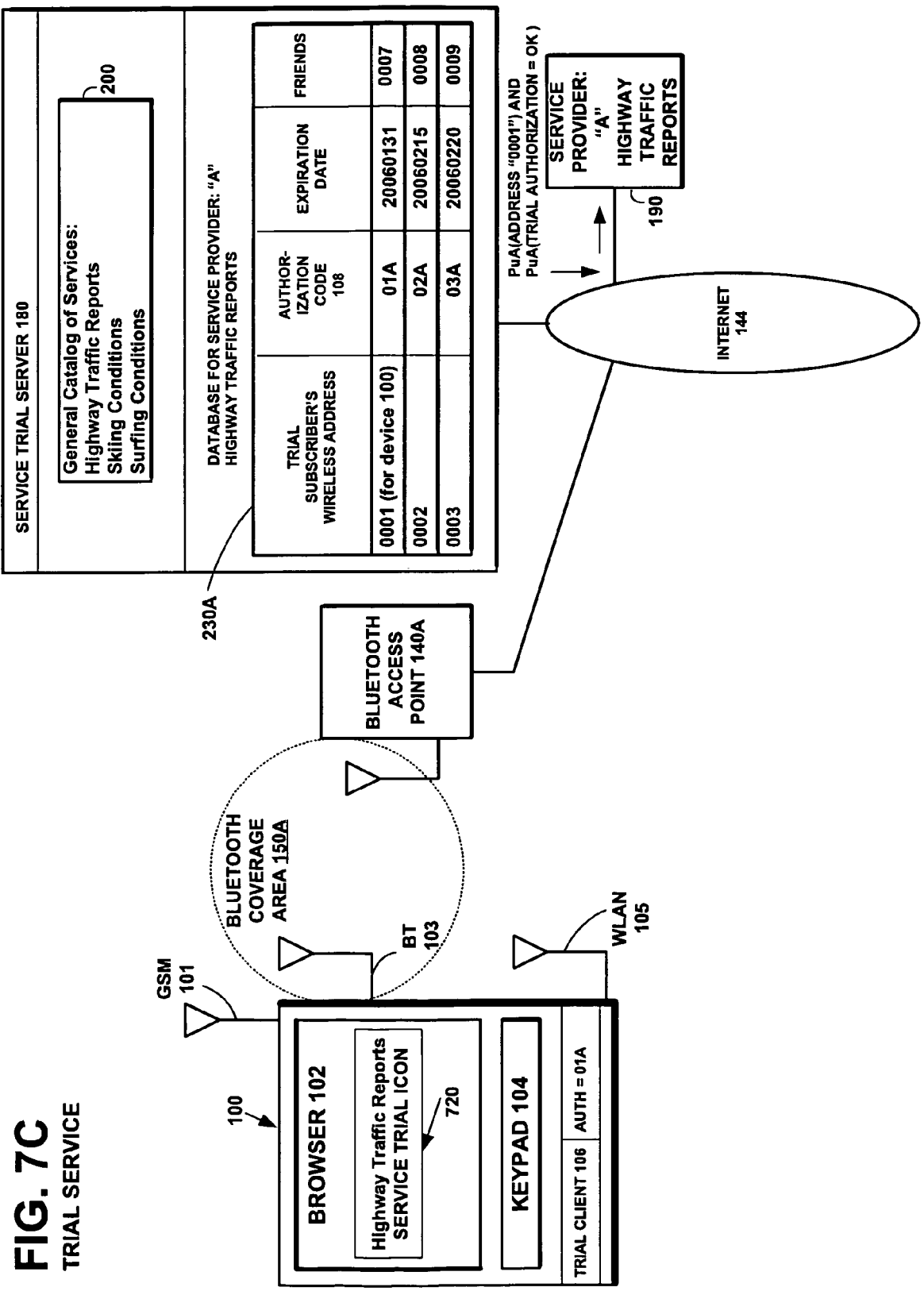
FIG. 7C is a network diagram according to an embodiment of the present invention illustrating the step in the trial service, of the Service Trial Server then responding to the service provider that the user is still within the trial period.

FIG. 7C is a network diagram according to an embodiment of the present invention illustrating the step in the trial service, showing the Service Trial Server 180 then responding to the service provider "A" 190 that the user is still within the trial period, indicating that the authorization is "OK" encrypted with the public key PuA of the service provider "A" 190.

Figure 7D:
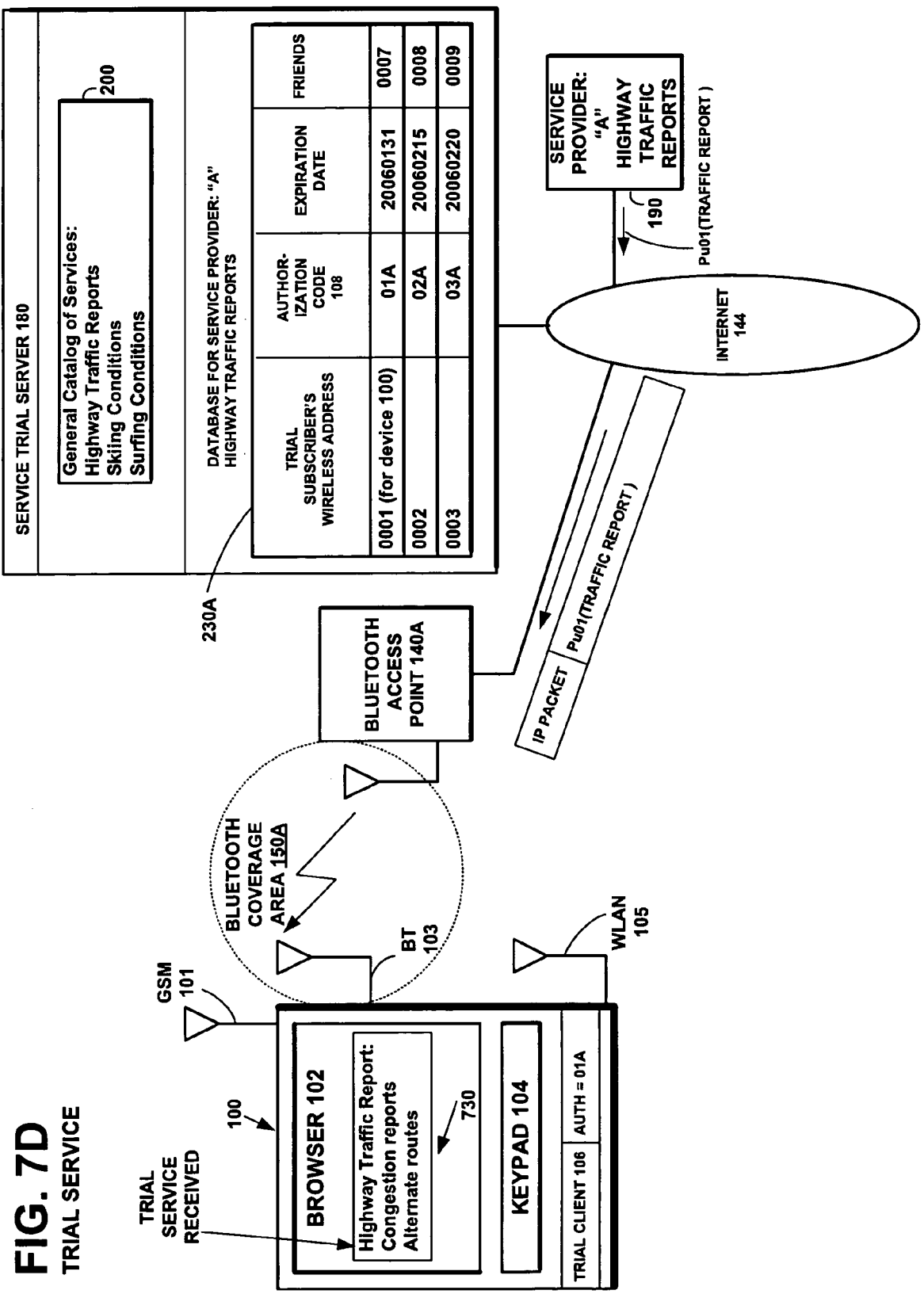
FIG. 7D is a network diagram according to an embodiment of the present invention illustrating the step in the trial service, of the service provider then providing the service to the user, who is still within the trial period.

FIG. 7D is a network diagram according to an embodiment of the present invention illustrating the step in the trial service, showing the service provider 180 then providing the requested traffic report to the user, who is still within the trial period. The traffic report is encrypted with the public key Pu01 of the user's wireless device 100. The traffic report 730 is displayed in the browser 102 of the user's wireless device 100.

Figure 7E:
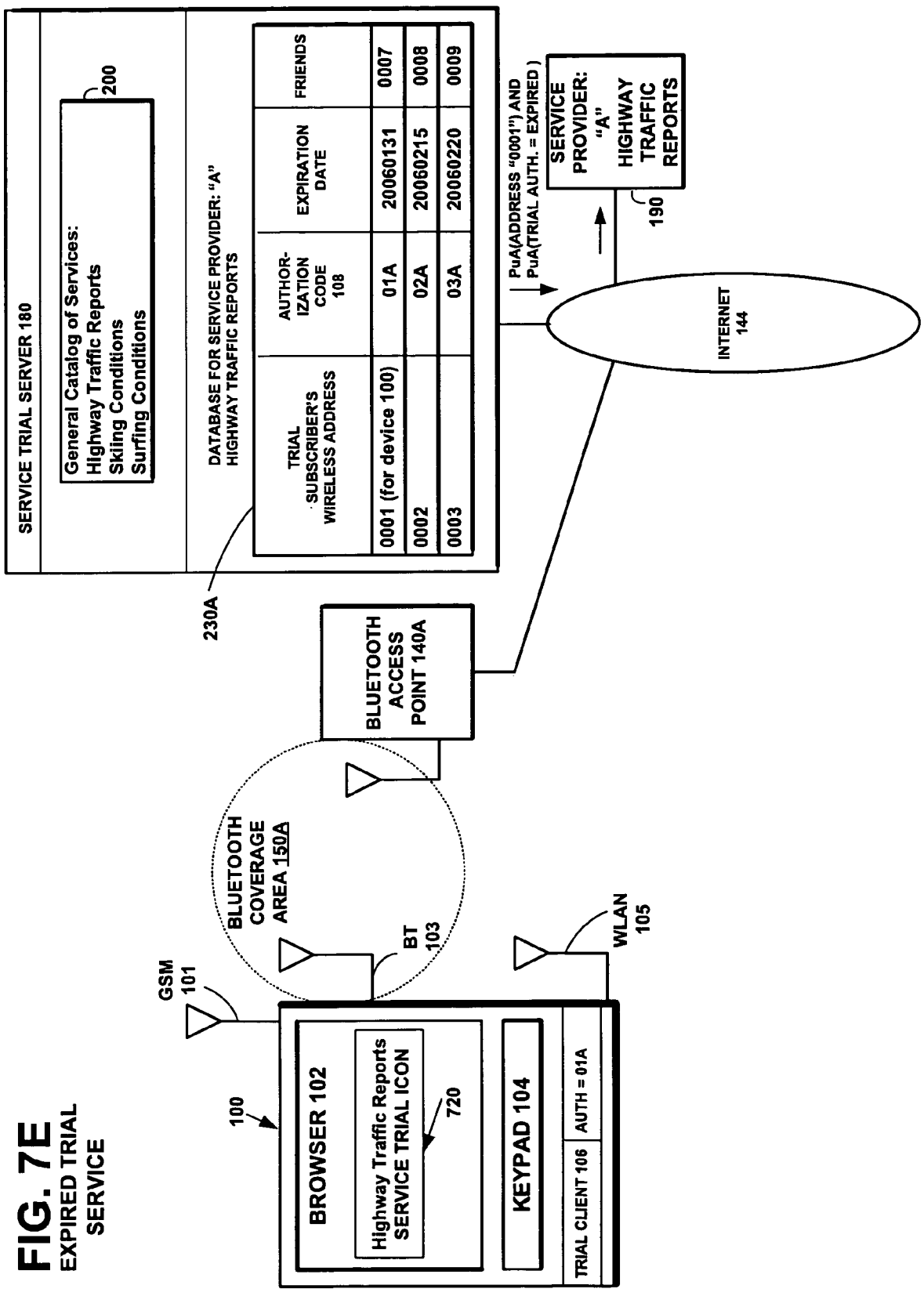
FIG. 7E is a network diagram according to an embodiment of the present invention illustrating the step after expiration of the trial service, of the Service Trial Server responding to the service provider that the user's trial period has expired.

FIG. 7E is a network diagram according to an embodiment of the present invention illustrating the step after expiration of the trial service, showing the Service Trial Server 180 responding to the service provider "A" 190 that the user's trial period has expired, indicating that the authorization is "Expired" encrypted with the public key PuA of the service provider "A" 190.

FIG. 7F is a network diagram according to an embodiment of the present invention illustrating the step after expiration of the trial service, showing the Service Trial Server 180 sending a message directly to the user 100 inviting the user 100 to subscribe to the service provider's normal paid-subscription service at the end of the trial period.

FIG. 7G is a network diagram according to an embodiment of the present invention illustrating the step after expiration of the trial service, showing the Service Trial Server 180 sending a message directly to the user's friends, such as the friend's wireless device 100', inviting them to subscribe to the service provider's normal paid-subscription service at the end of the trial period.

FIG. 8 is a flow diagram for providing a trial online service accessible by a plurality of mobile wireless devices according to another embodiment of the present invention. The steps of the flow diagram represent programmed sequences of operational instructions which, when executed by computer processors, for example, in the user's wireless device 100, in the user's friend's wireless device 100', in the Service Trial Server 180, and in the service provider 190, carry out the methods of the invention. Step 810 of the flow diagram of FIG. 8 begins with the Provider's Service Trial icon 244' shown in FIG. 3C, the icon being displayed on the service provider's web page menu 242 with a link to the Service Trial Server 180 to directly set up the trial, according to another embodiment of the present invention. Since the user is viewing the service provider's menu 242 on the service provider's web site, the activation of Provider's Service Trial icon 244' bypasses the accessing of the general catalog 200 and invokes the Service Trial Server 180 to directly set up the provider's trial service.

The steps of the flow diagram of FIG. 8 are as follows:

Step 810: displaying a Provider's Service Trial Icon of an online service provided by a service provider, the Provider's Service Trial Icon displayed on a user's mobile wireless device with a link to trial-provisioning logic within a Service Trial Server to set up a trial service subscription to be provided by the service provider for a limited period of time to the user's mobile wireless device.

Step 812: activating the Provider's Service Trial Icon and its associated link to cause the Service Trial Server to set up the trial service subscription with a Service Trial Client in the user's mobile wireless device.

Step 814: sending wireless addresses of one or more friends' wireless devices in association with said activating step.

Step 816: sending the user's wireless network address from the Service Trial Server to the service provider.

Step 818: receiving an authorization code from the service provider that is forwarded by the Service Trial Server to the Service Trial Client software module in the user's mobile wireless device.

Step 820: distributing said authorization code and an invitation to join in the trial to said wireless addresses of the one or more friends.

Step 822: accessing the service by the user's and the friends' mobile wireless devices during the subscriber's trial period.

The resulting invention creates following benefits:

1. Combines discovery, trial and subscription through a reliable and easily accessible channel.

2. Service trial is extended from individuals to the community around them, which brings forward a strong case for person-to-person marketing.

3. Fast and easy user experience Over-The-Air, at many locations.

4. Enhanced download manager functionality.

5. Social aspects on service trials: end users can see services immediately in their social context without having to wait until there are enough friends who have the service activated.

6. End users can try before subscription: The threshold for service trial is much lower and end users can find benefits of new services before committing to them.

7. The invention boosts the subscription to services.

The invention can be applied to wireless personal area networks employing the Bluetooth Standard, and to wireless local area networks employing the IEEE 802.11 Wireless LAN Standard or the HIPERLAN Standard. Moreover, the invention can be applied to the wireless networks based on the Infrared Data Association (IrDA) standard, the Digital Enhanced Cordless Telecommunications (DECT) standard, the Shared Wireless Access Protocol (SWAP) standard, the IEEE 802.15 Wireless Personal Area Network (WPAN) standard, the Japanese 3rd Generation (3G) wireless standard, and the Multimedia Mobile Access Communication (MMAC) Systems standard of the Japanese Association of Radio Industries and Businesses.

Although specific embodiments of the invention have been disclosed, a person skilled in the art will understand that changes can be made to the specific embodiments without departing from the spirit and scope of the invention.

What is claimed is:

1. A method for providing a trial online service accessible by a plurality of mobile wireless devices of, comprising:

storing a Service Trial Client software module in a user's mobile wireless device displaying a service trial icon in the mobile wireless device with a link to a Service Trial Server;

wirelessly connecting the mobile wireless device to the Service Trial Server when the link is activated;

wirelessly downloading to the mobile wireless device from the Service Trial Server a general catalog of available online services;

displaying a Provider's Service Trial Icon of an online service listed in the catalog associated with a service provider of an online service, the Provider's service trial icon displayed with a link to trial-provisioning logic within the Service Trial Server to set up a trial service subscription to be provided by the service provider for a limited period of time for the user's mobile wireless device;

activating the provider's service trial icon and its associated link to set up the trial service subscription using the Service Trial Server to be provided by the service provider;

sending wireless addresses of one or more friends' wireless devices to the Service Trial Server in association with said activating step;

sending the user's wireless network address from the Service Trial Server to the service provider;

receiving an authorization code from the service provider that is forwarded by the Service Trial Server to the Service Trial Client software module in the user's mobile wireless device;

distributing said authorization code and an invitation to join in the trial to said wireless addresses of the one or more friends; and accessing the service by the user's and the friends' mobile wireless devices during the user's trial period by:

directly addressing the service provider by the user's mobile wireless device over the wireless network and sending the user's authorization code;

sending by said service provider a query including the user's wireless address and authorization code to the Service Trial Server;

checking by Said Service Trial Server to confirm that the user's trial period has not expired;

responding by Said Service Trial Server to the service provider whether the user is still within the trial period; and if still within the trial period, proceeding by the service provider to provide the service to the user.

2. The method for providing a trial online service accessible by a plurality of mobile wireless devices of claim 1, further comprising:

if the user's trial period has expired, then the Service Trial Server sending a request directly to the user and the user's friends to subscribe to the service provider's normal paid-subscription service at the end of the trial period.

3. The method for providing a trial online service accessible by a plurality of mobile wireless devices of claim 1, further comprising:

said accessing the service being sending the request for the service to the Service Trial Server;

if the user's trial period has not expired, then the Service Trial Server sending a message to the service provider including the user's wireless address and authorization code, authorizing the service provider to provide the service to the user.

4. The method for providing a trial online service accessible by a plurality of mobile wireless devices of claim 1, further comprising:
monitoring each trial service subscriber on a periodic basis by the Service Trial Server and when a trial period is found to have expired for a trial service subscriber, prompting the trial service subscriber and its named friends to subscribe to the service provider's normal paid-subscription service.

5. The method for providing a trial online service accessible by a plurality of mobile wireless devices of claim 1, further comprising:
directly addressing the friends' mobile wireless devices with the user's mobile wireless device and sending the authorization code and an invitation to a free subscription to the service.

6. The method for providing a trial online service accessible by a plurality of mobile wireless devices of claim 1, further comprising:
addressing the friends' mobile wireless devices with the Service Trial Server and sending the authorization code and an invitation to a free subscription to the service.

7. The method for providing a trial online service accessible by a plurality of mobile wireless devices of claim 1, further comprising:
sending a copy of the Service Trial Client software module to a friend's mobile wireless device that does not have a copy.

8. The method for providing a trial online service accessible by a plurality of mobile wireless devices of claim 1, further comprising:
sending a notice to the user when a friend accepts the invitation to the trial service indicating that the friend has joined in the trial.

9. A method for providing a trial online service accessible by a plurality of mobile wireless devices of, comprising:
storing a Service Trial Client software module in a user's mobile wireless device
displaying a service trial icon in the mobile wireless device with a link to a Service Trial Server;
wirelessly connecting the mobile wireless device to the Service Trial Server when the link is activated;
wirelessly downloading to the mobile wireless device from the Service Trial Server a general catalog of available online services;
displaying a Provider's Service Trial Icon of an online service listed in the catalog associated with a service provider of an online service, the Provider's service trial icon displayed with a link to trial-provisioning logic within the Service Trial Server to set up a trial service subscription to be provided by the service provider for a limited period of time for the user's mobile wireless device;
activating the provider's service trial icon and its associated link to set up the trial service subscription using the Service Trial Server to be provided by the service provider;
sending wireless addresses of one or more friends' wireless devices to the Service Trial Server in association with said activating step;
sending the user's wireless network address from the Service Trial Server to the service provider;
receiving an authorization code from the service provider that is forwarded by the Service Trial Server to the Service Trial Client software module in the user's mobile wireless device;
distributing said authorization code and an invitation to join in the trial to said wireless addresses of the one or more friends; and
accessing the service by the user's and the friends' mobile wireless devices during the user's trial period by:
directly addressing the service provider by one of the friend's mobile wireless devices over the wireless network and sending the user's authorization code and user's wireless address;
sending by said service provider a query including the friend's wireless address and user's wireless address and user's authorization code to the Service Trial Server;
checking by Said Service Trial Server to confirm that the user's trial period has not expired;
responding by Said Service Trial Server to the service provider whether the user is still within the trial period;
if still within the period, then proceeding by the service provider to provide the service to the friend;
if the user's trial period has expired, then the Service Trial Server sending a request directly to the user and the user's friends to subscribe to the service provider's normal paid-subscription service at the end of the trial period.

10. The method for providing a trial online service accessible by a plurality of mobile wireless devices of claim 9, further comprising:
said accessing the service being sending the request for the service to the Service Trial Server;
if the user's trial period has not expired, then the Service Trial Server sending a message to the service provider including the user's wireless address and authorization code, authorizing the service provider to provide the service to the user.

11. The method for providing a trial online service accessible by a plurality of mobile wireless devices of claim 9, further comprising:
monitoring each trial service subscriber on a periodic basis by the Service Trial Server and when a trial period is found to have expired for a trial service subscriber, prompting the trial service subscriber and its named friends to subscribe to the service provider's normal paid-subscription service.

12. The method for providing a trial online service accessible by a plurality of mobile wireless devices of claim 9, further comprising:
directly addressing the friends' mobile wireless devices with the user's mobile wireless device and sending the authorization code and an invitation to a free subscription to the service.

13. The method for providing a trial online service accessible by a plurality of mobile wireless devices of claim 9, further comprising:
addressing the friends' mobile wireless devices with the Service Trial Server and sending the authorization code and an invitation to a free subscription to the service.

14. The method for providing a trial online service accessible by a plurality of mobile wireless devices of claim 9, further comprising:
sending a copy of the Service Trial Client software module to a friend's mobile wireless device that does not have a copy.

15. The method for providing a trial online service accessible by a plurality of mobile wireless devices of claim 9, further comprising:

sending a notice to the user when a friend accepts the invitation to the trial service indicating that the friend has joined in the trial.

16. A system for providing a trial online service accessible by a plurality of mobile wireless devices, comprising:

a Service Trial Client software module in a user's mobile wireless device;

a service trial icon in the mobile wireless device with a link to a Service Trial Server, wherein said Service Trial Server wirelessly connected to the mobile wireless device when the link is activated for downloading to the mobile wireless device a general catalog of available online services;

said Service Trial Client displaying a Provider's service trial icon of an online service listed in the catalog associated with a service provider of an online service, the Provider's service trial icon displayed with a link to trial-provisioning logic within the Service Trial Server to set up a trial service subscription to be provided by the service provider to the user's mobile wireless device for a limited period of time;

said Service Trial Server responding to an activation of the provider's service trial icon and its associated link to set up the trial service subscription to be provided by the service provider;

said Service Trial Server receiving wireless addresses of one or more friends' wireless devices in association with said activating step;

said Service Trial Server sending the user's wireless network address to the service provider;

said Service Trial Server receiving an authorization code from the service provider that is forwarded by the Service Trial Server to the Service Trial Client software module in the users mobile wireless device;

said Service Trial Server distributing said authorization code and an invitation to join in the trial to said wireless addresses of the one or more friends;

said user's and the friends' mobile wireless devices accessing the service during the user's trial period;

said the user's mobile wireless device directly addressing the service provider over the wireless network and sending the user's authorization code;

said Service Trial Server receiving from said service provider a query including the user's wireless address and authorization code;

said Service Trial Server checking to confirm that the user's trial period has not expired;

said Service Trial Server responding to the service provider whether the user is still within the trial period; and if still within the trial period, said service provider proceeding to provide the service to the user.

17. The system for providing a trial online service accessible by a plurality of mobile wireless devices of claim 16, further comprising:

if the user's trial period has expired, then said Service Trial Server sending a request directly to the user and the user's friends to subscribe to the service provider's normal paid subscription service at the end of the trial period.

18. A system for providing a trial online service accessible by a plurality of mobile wireless devices, comprising:

a Service Trial Client software module in a user's mobile wireless device a service trial icon in the mobile wireless device with a link to a Service Trial Server, wherein said Service Trial Server wirelessly connected to the mobile wireless device when the link is activated for downloading to the mobile wireless device a general catalog of available online services;

said Service Trial Client displaying a Provider's service trial icon of an online service listed in the catalog associated with a service provider of an online service, the Provider's service trial icon displayed with a link to trial-provisioning logic within the Service Trial Server to set up a trial service subscription to be provided by the service provider to the user's mobile wireless device for a limited period of time;

said Service Trial Server responding to an activation of the provider's service trial icon and its associated link to set up the trial service subscription to be provided by the service provider;

said Service Trial Server receiving wireless addresses of one or more friends' wireless devices in association with said activating step;

said Service Trial Server sending the user's wireless network address to the service provider;

said Service Trial Server receiving an authorization code from the service provider that is forwarded by the Service Trial Server to the Service Trial Client software module in the users mobile wireless device;

said Service Trial Server distributing said authorization code and an invitation to join in the trial to said wireless addresses of the one or more friends;

said user's and the friends' mobile wireless devices accessing the service during the user's trial period;

one of said friend's mobile wireless devices directly addressing the service provider over the wireless network and sending the user's authorization code and user's wireless address;

said Service Trial Server receiving from said service provider a query including the friend's wireless address and user's wireless address and user's authorization code;

said Service Trial Server checking to confirm that the user's trial period has not expired; said Service Trial Server responding to the service provider whether the user is still within the trial period;

if still within the period, then said service provider proceeding to provide the service to the friend;

if the user's trial period has expired, then said Service Trial Server sending a request directly to the user and the user's friends to subscribe to the service provider's normal paid-subscription service at the end of the trial period.

19. A computer-readable storage medium carrying one or more sequences of one or more instructions which, when executed by one or more processors, cause a system to at least perform the following steps:

storing a Service Trial Client software module in a user's mobile wireless device displaying a service trial icon in the mobile wireless device with a link to a Service Trial Server;

wirelessly connecting the mobile wireless device to the Service Trial Server when the link is activated;

wirelessly downloading to the mobile wireless device from the Service Trial Server a general catalog of available online services;

displaying a Provider's service trial icon of an online service listed in the catalog associated with a service provider of an online service, the Provider's service trial icon displayed with a link to trial-provisioning logic within the Service Trial Server to set up a trial service subscription to be provided by the service provider for a limited period of time for the user's mobile wireless device;

activating the provider's service trial icon and its associated link to set up the trial service subscription using the Service Trial Server to be provided by the service provider;

sending wireless addresses of one or more friends' wireless devices to the Service Trial Server in association with said activating step;

sending the user's wireless network address from the Service Trial Server to the service provider;

receiving an authorization code from the service provider that is forwarded by the Service Trial Server to the Service Trial Client software module in the user's mobile wireless device;

distributing said authorization code and an invitation to join in the trial to said wireless addresses of the one or more friends; and accessing the service by the user's and the friends' mobile wireless devices during the user's trial period by:

directly addressing the service provider by the user's mobile wireless device over the wireless network and sending the user's authorization code;

sending by said service provider a query including the user's wireless address and authorization code to the Service Trial Server;

checking by Said Service Trial Server to confirm that the user's trial period has not expired;

responding by Said Service Trial Server to the service provider whether the user is still within the trial period; and determining if still within the trial period, then proceeding by the service provider to provide the service to the user.

20. The computer-readable storage medium of claim 19, wherein the system is caused to further perform:

determining if the user's trial period has expired, then the Service Trial Server sending a request directly to the user and the user's friends to subscribe to the service provider's normal paid-subscription service at the end of the trial period.

21. A computer-readable storage medium carrying one or more sequences of one or more instructions which, when executed by one or more processors, cause a system to at least perform the following steps:

storing a Service Trial Client software module in a user's mobile wireless device;

displaying a service trial icon in the mobile wireless device with a link to a Service Trial Server;

wirelessly connecting the mobile wireless device to the Service Trial Server when the link is activated;

wirelessly downloading to the mobile wireless device from the Service Trial Server a general catalog of available online services;

displaying a Provider's service trial icon of an online service listed in the catalog associated with a service provider of an online service, the Provider's service trial icon displayed with a link to trial-provisioning logic within the Service Trial Server to set up a trial service subscription to be provided by the service provider for a limited period of time for the user's mobile wireless device;

activating the provider's service trial icon and its associated link to set up the trial service subscription using the Service Trial Server to be provided by the service provider;

sending wireless addresses of one or more friends' wireless devices to the Service Trial Server in association with said activating step;

sending the user's wireless network address from the Service Trial Server to the service provider;

receiving an authorization code from the service provider that is forwarded by the Service Trial Server to the Service Trial Client software module in the user's mobile wireless device;

distributing said authorization code and an invitation to join in the trial to said wireless addresses of the one or more friends; and accessing the service by the user's and the friends' mobile wireless devices during the user's trial period by:

directly addressing the service provider by one of the friend's mobile wireless devices over the wireless network and sending the user's authorization code and user's wireless address;

sending by said service provider a query including the friend's wireless address and user's wireless address and user's authorization code to the Service Trial Server;

checking by said Service Trial Server to confirm that the user's trial period has not expired;

responding by said Service Trial Server to the service provider whether the user is still within the trial period;

determining if still within the period, then proceeding by the service provider to provide the service to the friend;

determining if the user's trial period has expired, then the Service Trial Server sending a request directly to the user and the user's friends to subscribe to the service provider's normal paid-subscription service at the end of the trial period.

* * * * *